United States Patent [19]

Lin et al.

[11] Patent Number: 5,426,739

[45] Date of Patent: Jun. 20, 1995

[54] LOCAL BUS - I/O BUS COMPUTER ARCHITECTURE

[75] Inventors: Fong Lu Lin, San Jose; Subir K. Ghosh, Santa Clara; Win Chen, Cupertino; Jhyping Shaw, San Jose, all of Calif.; Chen-Yung V. Chen, Taipei, Taiwan, Prov. of China

[73] Assignee: OPTi, Inc., Santa Clara, Calif.

[21] Appl. No.: 961,773

[22] Filed: Oct. 14, 1992

Related U.S. Application Data

[63] Continuation-in-part of Ser. No. 851,444, Mar. 16, 1992, Pat. No. 5,309,568.

[51] Int. Cl.6 .............................................. G06F 13/00
[52] U.S. Cl. ............................ 395/325; 364/DIG. 1; 364/240; 364/240.2; 364/240.3
[58] Field of Search ............... 395/325, 275, 250, 500; 439/60

[56] References Cited

U.S. PATENT DOCUMENTS

| | | | |
|---|---|---|---|
| 4,407,016 | 9/1983 | Bayliss et al. | 364/200 |
| 4,635,192 | 1/1987 | Ceccon et al. | 395/325 |
| 4,695,948 | 9/1987 | Blevins et al. | 395/325 |
| 4,870,704 | 9/1989 | Matelan et al. | 395/800 |
| 4,933,845 | 6/1990 | Hayes | 395/325 |
| 4,991,085 | 2/1991 | Pleva et al. | |
| 5,038,320 | 8/1991 | Heath et al. | 395/275 |
| 5,043,877 | 8/1991 | Berger et al. | 395/325 |
| 5,070,449 | 12/1991 | Dawson et al. | 395/425 |
| 5,088,028 | 2/1992 | Theus et al. | 395/325 |
| 5,111,423 | 5/1992 | Kopec, Jr. et al. | 395/500 |
| 5,123,092 | 6/1992 | Buxton et al. | 395/250 |
| 5,125,080 | 6/1992 | Pleva et al. | 395/325 |
| 5,175,826 | 12/1992 | Begun et al. | 395/325 |
| 5,182,808 | 1/1993 | Bagnoli et al. | 395/725 |
| 5,185,876 | 2/1993 | Nguyen et al. | 395/425 |
| 5,191,657 | 3/1993 | Ludwig et al. | 395/325 |
| 5,201,055 | 4/1993 | Izquierdo et al. | 395/800 |
| 5,241,631 | 8/1993 | Smith et al. | 395/325 |
| 5,253,348 | 10/1993 | Sculise | 395/325 |
| 5,277,591 | 6/1993 | Felcman et al. | 439/60 |
| 5,317,721 | 5/1994 | Robinson | 395/500 |

FOREIGN PATENT DOCUMENTS

0379176A2 7/1990 European Pat. Off. .

OTHER PUBLICATIONS

Appian Technology, Inc., "System 90/SX" (data sheet) (Nov. 1990).*

Tseng Labs, Inc., "ET400 Graphics Controller" (databook)(1990).*

Tseng Labs, Inc. 386SX Board Design Document (1990).*

(List continued on next page.)

*Primary Examiner*—Jack B. Harvey
*Assistant Examiner*—Ayaz R. Sheikh
*Attorney, Agent, or Firm*—Fliesler, Dubb, Meyer & Lovejoy

[57] ABSTRACT

In a computer system, one or more ISA connector sockets is replaced by a connector structure which carries both ISA signals and local bus signals. The connector structure is arranged such that a standard ISA accessory card may be inserted, in which case only ISA signals are coupled to or from the card. "Local bus" accessory cards may also be designed for insertion into such a connector, and these cards may connect to one or more signal lines of the local bus either additionally or instead of connections made to the ISA bus. By physical or other means, ISA accessory cards are prevented from unintentional contact with connector contacts which are coupled to local bus signal lines. The connector structure may advantageously comprise an EISA-type connector socket.

32 Claims, 16 Drawing Sheets

OTHER PUBLICATIONS

Thorson, Mark, "S3 Introduces Flexible PC Chip Set Family", Microprocessor Report, MicroDesign Resources, Inc., vol. 4, No. 9, pp. 1, 9-11 (May 18, 1990).

Wilson, Ron, "New PC chip sets take on multiprocessing", Computer Design (Jun. 1, 1990) pp. 34, 36.

Intel Corporation, "Peripheral Component Interconnect (PCI)", Revision 1.0 Specification (Jun. 22, 1992).

OPTi, Inc., "OPTi—DXBB PC/AT Chipset (82C496/82C206)", Preliminary 82C496 Data Book, Version 1.2, Jun. 1, 1992.

OPTi, Inc., "OPTi-DXBB PC/AT Chipset (82C497)", Preliminary 82C497 Data Book, Version 2.0, Mar. 10, 1992.

S3, Incorpoarted, "86C911 GUI Accelerator" (databook) (Apr. 1992).

Slater, Michael, and Thorson, Mark, "Local buses Poised to Enter PC Mainstream", Microprocessor Report (Jul. 8, 1992), pp. 7-13.

Solari, Edward, "AT Bus Design", Annabooks (1990), pp. 14-183 through 14-189.

Video Electronics Standards Association, "VESA VL-Bus TM Local Bus Standard", Revision No. 1.0, Aug. 28, 1992.

Micro Design Resources, Inc., "PC Chip Sets" (1992), pp. 2—2 through 2-8, 5-1 through 5-7, Appendix C, Appendix D.

FIG. 11A
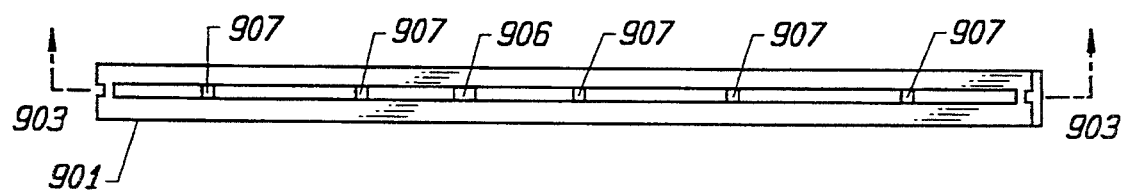
FIG. 12A
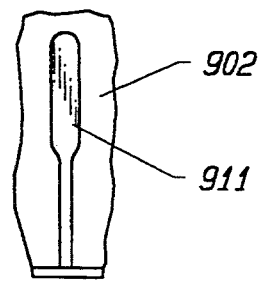
FIG. 12B
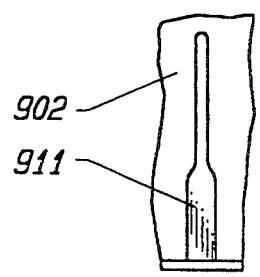
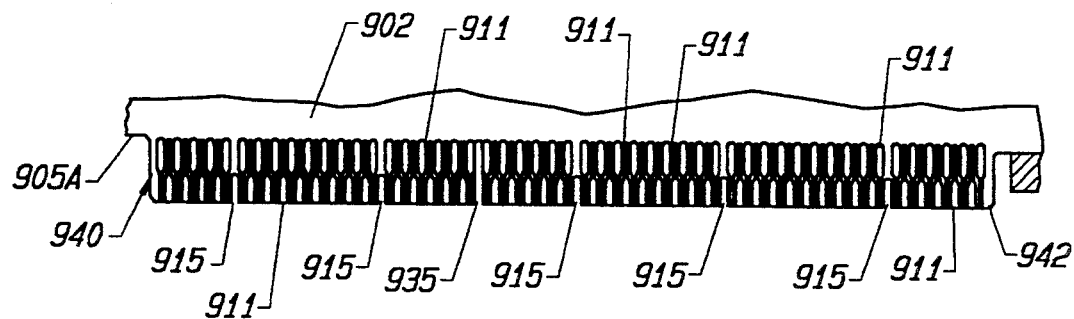
FIG. 12

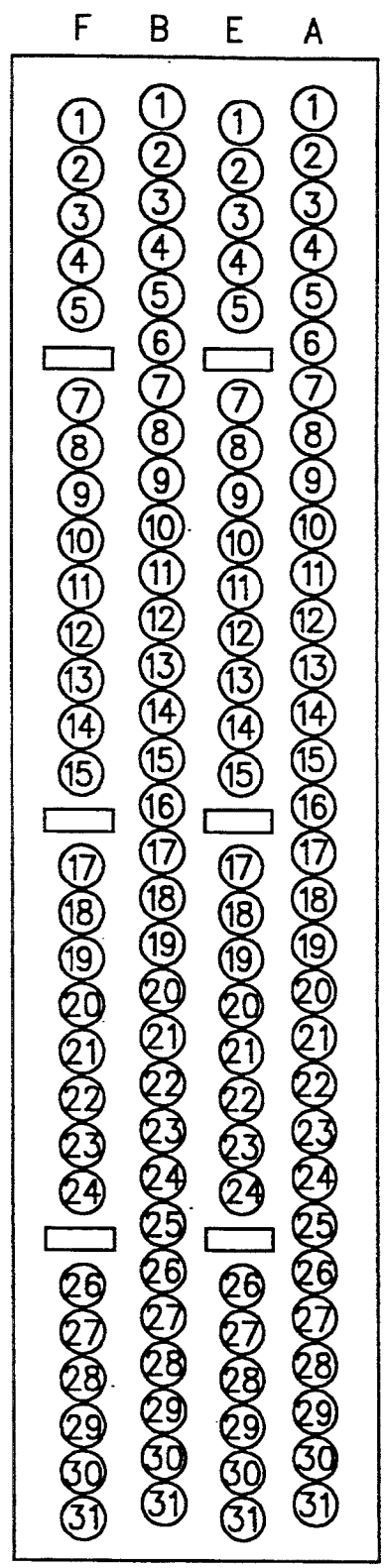
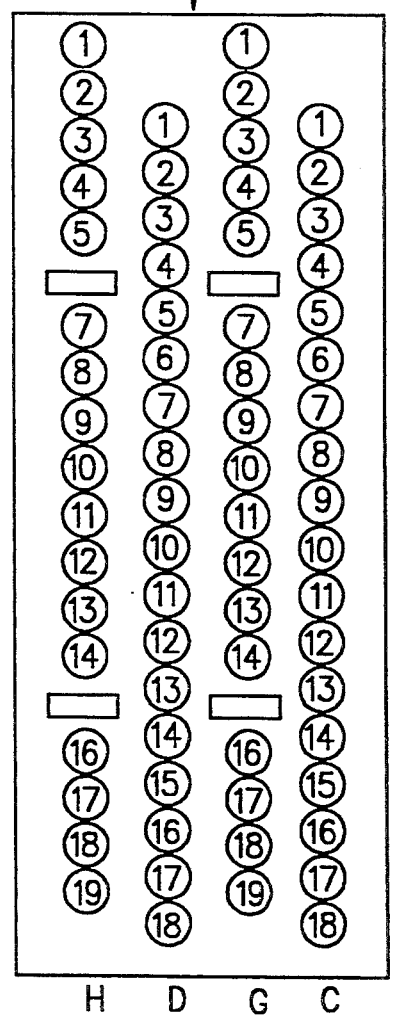
FIG. 13

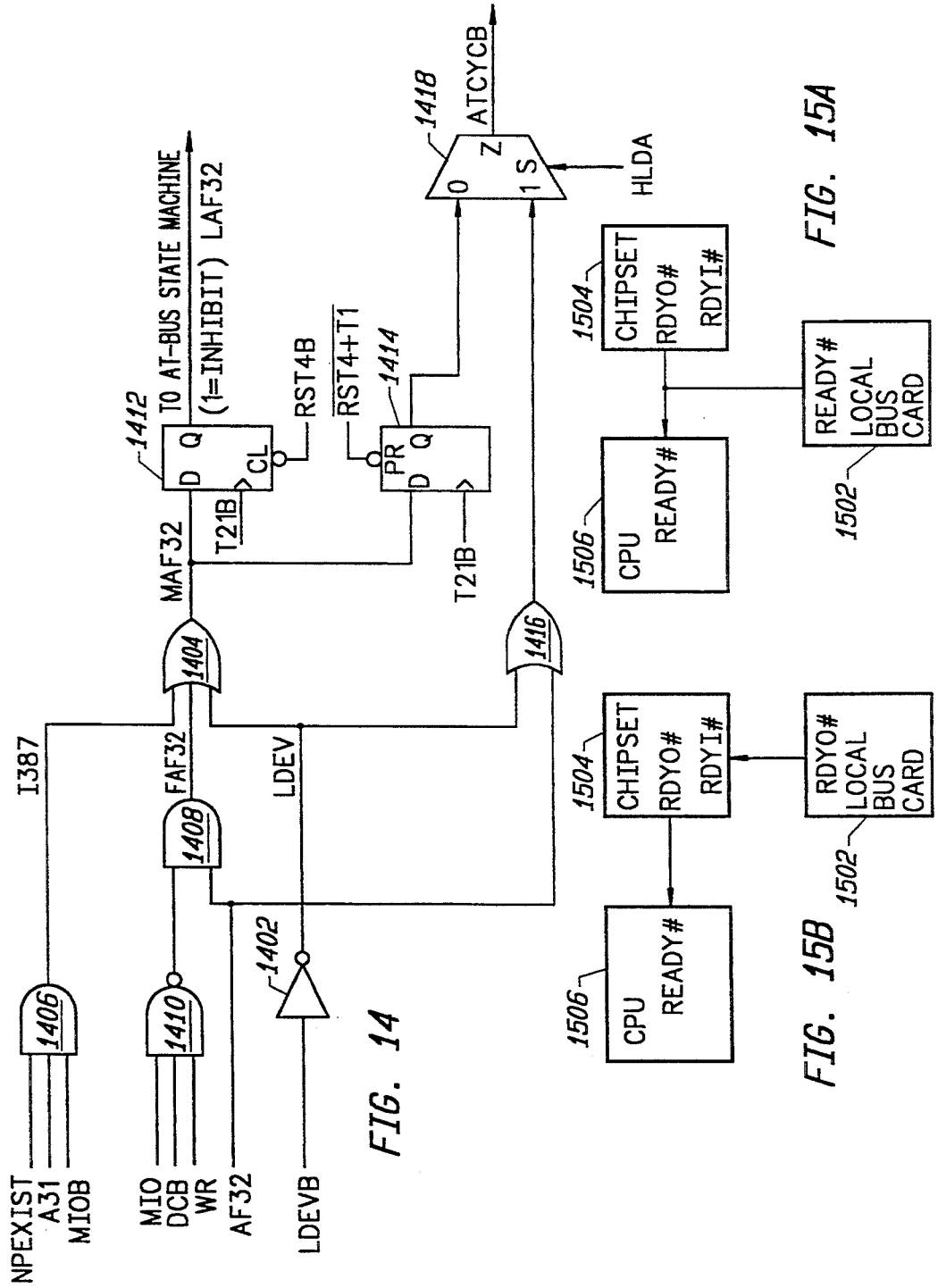

LOCAL BUS - I/O BUS COMPUTER ARCHITECTURE

This is a Continuation-in-Part of U.S. patent application Ser. No. 07/851,444, filed Mar. 16, 1992 (Attorney Docket No. OPTI3030WSW), now U.S. Pat. No. 5,309,568. The parent application is owned by the assignee of the present application and incorporated herein by reference.

BACKGROUND

1. Field of the Invention

The invention relates to IBM PC AT-compatible computer architectures, and more particularly, to enhancements thereof for communicating with I/O peripheral devices.

2. Description of Related Art

The IBM PC AT computer architecture has become an industry standard architecture for personal computers and is typically built around a CPU such as an 80286, 80386SX, 80386DX, or 80486 microprocessor manufactured by Intel Corporation. The CPU is coupled to a local bus, capable of performing memory accesses and data transfers at high rates of speed (i.e., on the order of 10–50 MHz with today's technology). The local bus includes 16 or 32 data lines, a plurality of address lines, and various control lines.

The typical IBM PC AT-compatible platform also includes DRAM main memory, and in many cases a timer, a real-time clock, and a cache memory, all coupled to the local bus.

The typical IBM PC AT-compatible computer also includes an I/O bus which is separate and distinct from the local bus. The I/O bus, sometimes referred to in these systems as an AT bus, an ISA bus or an EISA bus, is coupled to the local bus via certain interface circuitry. The I/O bus includes 8, 16 or 32 data lines, a plurality of I/O address lines, as well as control lines. The I/O address space is logically distinct from the memory address space and if the CPU desires to access an I/O address, it does so by executing a special I/O instruction. Such an I/O instruction generates memory access signals on the local bus, but also activates an MIO# signal to indicate that this is an access to the I/O address space. The MIO# line is often considered as merely another address line. The interface circuitry recognizes the I/O signals thereby generated by the CPU, performs the desired operation over the I/O bus, and if appropriate, returns results to the CPU over the local bus.

In practice, some I/O addresses may reside physically on the local bus and some memory addresses may reside physically on the I/O bus. The interface circuitry is responsible for recognizing that a memory or I/O address access must be emulated by an access to the other bus, and is responsible for doing such emulation. For example, a ROM (or EPROM) BIOS may be physically on the I/O bus, but actually form part of the local memory address space. During system boot, when the CPU sends out a non-I/O address which is physically within the ROM BIOS, the interface circuitry recognizes such, enables a buffer which couples the address onto the I/O bus, and activates the chip select for the ROM. The interface circuitry then assembles a data word of the size expected by the CPU, from the data returned by the ROM, and couples the word onto the local bus for receipt by the CPU. In many systems, at some point during the ROM-based boot-up procedure, the ROM BIOS is copied into equivalent locations in the DRAM main memory and thereafter accessed directly. The portion of DRAM main memory which receives such portions of the BIOS is sometimes referred to as "shadow RAM."

More specifically, in the standard architecture, the logical main memory address space is divided into a low memory range (0h–9FFFFh), a reserved memory range (A0000h–FFFFFh) and an extended memory range (100000h–FFFFFFh). In a typical system the system ROM BIOS is located logically at addresses F0000h–FFFFFh, and is located physically on the I/O bus. Addresses C0000h–EFFFFh contain ROM BIOS portions for specific add-on cards and are located physically on their respective cards on the I/O bus. Addresses A0000h–BFFFFh contain the video buffer, located physically on a video controller on the I/O bus. Duplicate memory space is typically provided in DRAM on the local bus for addresses C0000h–FFFFFh, and the user of the system can select during a setup procedure, which portions of the ROM BIOS are to be "shadowed" by being copied into the duplicate DRAM space during boot-up. Subsequent accesses to "shadowed" portions of the BIOS are to the DRAM copy, which is typically much faster than accesses to the ROM copy.

In addition to the above elements, a keyboard controller typically is also coupled to the I/O bus, as is a video display controller. A typical IBM PC AT-compatible system may also include a DMA controller which permits peripheral devices on the I/O bus to read or write directly to or from main memory, as well as an interrupt controller for transmitting interrupts from various add-on cards to the CPU. The add-on cards are cards which may be plugged into slot connectors coupled to the I/O bus to increase the capabilities of the system. Add-on cards are also sometimes referred to as expansion cards or accessory cards.

General information on the various forms of IBM PC AT-compatible computers can be found in IBM, "PC/AT Technical Reference Manual", in Sanchez, "IBM Microcomputers: A Programmer's Handbook" (McGraw-Hill: 1990), in MicroDesign Resources, "PC Chip Sets" (1992), and in Solari, "AT Bus Design" (San Diego: Annabooks, 1990). See also the various data books and data sheets published by Intel Corporation concerning the structure and use of the iAPX-86 family of microprocessors, including the "i486 Microprocessor Hardware Reference Manual", published by Intel Corporation, copyright date 1990, "386 SX Microprocessor", data sheet, published by Intel Corporation (1990), and "386 DX Microprocessor", data sheet, published by Intel Corporation (1990). All the above references are incorporated herein by reference.

The local bus includes a plurality of address lines and a plurality of data lines, as well as a number of control lines. Unless it is separated from the CPU bus by a bridge as hereinafter described, the exact set of lines which make up the local bus is well known in the industry, and may be determined from various sources, including the references cited above. For present purposes, it is sufficient to identify the following signal lines on the local bus ("#" indicates active low):

| | |
|---|---|
| CA(23:1) or CA(31:2) | Address lines. For the 80286 and 80386SX, 24 bits of address are |

|                        |                                                                                                                                                                                                                                                                                                                                                     |
| ---------------------- | --------------------------------------------------------------------------------------------------------------------------------------------------------------------------------------------------------------------------------------------------------------------------------------------------------------------------------------------------- |
|                        | provided. The high order 23 bits are provided on CA(23:1). For the 80386DX and 80486, 32 bits of address are available. The high order 30 bits are provided on CA(31:2).                                                                                                                                                                           |
| BHE# & BLE# or BE#(3:0) | Byte High Enable and Byte Low Enable, or Byte Enables (3:0). For the 80286 and 80386SX, BLE# can be thought of as equivalent to CA(0) and BHE# = !BLE#. For the 80386DX and 80486, BE#(3:0) carries a 1-of-4 decode of the 2 low order address bits.                                                                                                |
| CD(15:0) or CD(31:0)   | Data lines. The 80286 and 80386SX operate with a 16-bit external data bus, and the 80386DX and 80486 operate with a 32-bit data bus.                                                                                                                                                                                                               |
| M/IO#                  | Memory/IO control line. When asserted low by the CPU, indicates that the address on CA is an I/O address as opposed to a main memory address.                                                                                                                                                                                                      |
| READY#                 | Acknowledgment to CPU that a current request has been serviced and CPU can start a new cycle. Sometimes abbreviated RDY#.                                                                                                                                                                                                                          |
| CLK2 or CLK            | CPU clock signal.                                                                                                                                                                                                                                                                                                                                  |
| W/R#                   | Distinguishes write cycles from read cycles.                                                                                                                                                                                                                                                                                                       |
| D/C#                   | Distinguishes data cycles, either memory or I/O, from control cycles which are: interrupt acknowledge, halt, and instruction fetching.                                                                                                                                                                                                             |
| LOCK#                  | Indicates that other system bus masters are denied access to the system bus while it is active.                                                                                                                                                                                                                                                    |
| ADS#                   | Indicates that a valid bus cycle definition and address (W/R#, D/C#, M/IO#, BE0#, BE1#, BE2#, BE3# (or BHE# and BLE#) and CA) are being driven on the local bus.                                                                                                                                                                                    |
| NA#                    | Requests address pipelining.                                                                                                                                                                                                                                                                                                                       |
| BS16# (386) BS8# (486) | Allows direct connection of 16-bit and 8-bit data buses.                                                                                                                                                                                                                                                                                           |
| HOLD                   | Allows another bus master to request control of the local bus. Also sometimes called HRQ.                                                                                                                                                                                                                                                          |
| HLDA                   | Indicates that the CPU has surrendered control of its local bus to another bus master.                                                                                                                                                                                                                                                             |
| BUSY#                  | Signals a busy condition from a processor extension.                                                                                                                                                                                                                                                                                               |
| ERROR#                 | Signals an error condition from a processor extension.                                                                                                                                                                                                                                                                                             |
| PEREQ                  | Indicates that the processor extension has data to be transferred by the CPU.                                                                                                                                                                                                                                                                      |
| INTR                   | A maskable input to CPU that signals the CPU to suspend execution of the current program and execute an interrupt acknowledge function.                                                                                                                                                                                                            |
| NMI                    | A non-maskable input that signals the CPU to suspend execution of the current program and execute an interrupt acknowledge function.                                                                                                                                                                                                               |
| RESET                  | Suspends any operation in progress and places the CPU in a known reset state.                                                                                                                                                                                                                                                                      |

The various signals on the I/O bus are also well specified and well known in the industry. The Solari book identified above describes the lines in detail. For present purposes, only the following signals are important:

|           |                                                                                                                                                                                                                                                                                                   |
| --------- | ------------------------------------------------------------------------------------------------------------------------------------------------------------------------------------------------------------------------------------------------------------------------------------------------- |
| SA(19:0)  | 20 address lines. Sufficient to address 1MB of memory. Only SA(15:0) are used to address the 64k I/O address space, and only SA(9:0) are used to address the basic 1k AT I/O address space.                                                                                                       |
| LA(23:17) | Additional address lines for addressing a 16 MB memory address space on the I/O bus. The LA lines are valid earlier in an I/O bus cycle, but must be latched if needed later in the cycle. The SA lines are not valid as early as the LA lines, but remain valid longer.                          |
| BALE      | Bus address latch enable line. In a CPU initiated I/O bus cycle, this line indicates when the SA address, AEN and SBHE# lines are valid. In other I/O bus cycles, the platform circuitry drives BALE high for the entire cycle.                                                                   |
| SBHE#     | System byte high enable. When SBHE# is active and SA(0) is low, then a 16-bit access will be performed.                                                                                                                                                                                           |
| AEN       | When active, informs I/O resources on I/O bus to ignore the address and I/O command signals. Used primarily in DMA cycles where only the I/O resource which has requested and received a DMA acknowledgment signal (DACK#) knows to ignore AEN and respond to the I/O signal lines. Some systems include slot-specific AEN$_x$ signal lines. |
| SD(15:0)  | 16 data lines.                                                                                                                                                                                                                                                                                    |
| MEMR#, SMEMR# | Read request lines to a memory resource on the I/O bus. SMEMR# is the same as MEMR# except that SMEMR# becomes active only when the read address is below 1 MB (i.e., LA(23:20) = 0). Also called MRDC# and SMRDC#, respectively.                                                             |
| MEMW# SMEMW# | Write request lines to a memory resource on the I/O bus. SMEMW# becomes active only when the write address is below 1 MB. Also called MWTC# and SMWTC#, respectively.                                                                                                                          |
| IOR#      | Read request line to an I/O resource on the I/O bus. Also called IORC#.                                                                                                                                                                                                                           |
| IOW#      | Write request line to an I/O resource on the I/O bus. Also called IOWC#.                                                                                                                                                                                                                          |
| MEMCS16#  | Memory chip select 16. Asserted by an addressed memory resource on the I/O bus if the resource can support a 16-bit memory access cycle.                                                                                                                                                          |
| IOCS16#   | I/O chip select 16. Asserted by an addressed I/O resource on the I/O bus if the resource can support a 16-bit I/O access cycle.                                                                                                                                                                   |
| SRDY#     | Synchronous Ready line. Also sometimes called OWS#, NOWS# or ENDXFR#. Activated by an addressed I/O resource to indicate that it can support a shorter-than-normal access cycle.                                                                                                                  |
| IOCHRDY   | I/O channel ready line. If this line is deactivated by an addressed I/O resource, the cycle will not end until it is reactivated. A deactivated IOCHRDY supersedes an activated SRDY#. Also sometimes called CHRDY.                                                                               |
| MASTER#   | After requesting and receiving a DMA-acknowledged (DACK#) signal, an I/O bus add-on card can assert                                                                                                                                                                                               |

| | |
|---|---|
| REFRESH# | MASTER# to become the bus master. Activated by refresh controller to indicate a refresh cycle. |
| IRQ(15, 14, 12:9, 7:3) | Interrupt request lines to interrupt controller for CPU. |
| DRQ(7:5, 3:0) | DMA Request lines from I/O resource on I/O bus to platform DMA controller. |
| DACK(7:5, 3:0) | DMA Acknowledge lines. |
| TC | DMA terminal count signal. Indicates that all data has been transferred. Also called T/C. |
| BCLK | I/O bus clock signal. 6–8.33 MHz square wave. |
| OSC | 14.318 MHz square wave. |

Recently, efforts have been made to reduce the size and improve the manufacturability of PC AT-compatible computers. Specifically, efforts have been made to minimize the number of integrated circuit chips required to build such a computer. Several manufacturers have developed "PC AT chipsets", which integrate a large amount of the I/O interface circuitry and other circuitry onto only a few chips. An example of such a chipset is the 386WB PC/AT chipset manufactured by OPTi, Inc., Santa Clara, Calif.

In the original IBM PC AT computer manufactured by IBM Corp., the I/O bus operated with a data rate of 8 MHz (BCLK=8 MHz). This was an appropriate data rate at that time since it was approximately equivalent to the highest data rates which the CPUs of that era could operate with on the local bus. Numerous third party vendors have since developed peripheral devices and controller cards which are intended to be plugged into an AT slot on the I/O bus, and which rely upon the 8 MHz maximum data rate. The AT standard also requires a wait state (i.e. 125 nS) for 16-bit data transfers, and four wait states (500 nS) for 8-bit data transfers. A zero wait state data transfer is also available, but only if the peripheral device signals, by activating the SRDY# control line on the I/O bus, that it can handle such fast data transfers.

In the years since the IBM PC AT was originally introduced, technology has improved dramatically to the point where local buses on typical high-end PC AT-compatible computers can operate on the order of 50 MHz. Despite these advances, however, such computers are still manufactured with an I/O bus operating at around 8 MHz because of the need to maintain compatibility with previously designed peripheral devices. These devices were designed in reliance upon the 8 MHz data rate and AT wait state protocol, and many such devices are not capable of operating faster. Even modern designs for AT bus peripherals often rely on the 8 MHz maximum data rate, even though very little additional effort or cost would be involved to design them to operate faster.

In addition to the large disparity between data transfer rates on the I/O bus as compared to the local bus in modern PC AT-compatible computers, the I/O interface circuitry needs to delay its handling of requests and responses from one bus to the other merely because the clocks are not synchronized. The circuitry therefore must hold a request or response until the appropriate clock edge on the destination bus appears. This can add on the order of 30–200 nS to each I/O bus cycle. Accordingly, it can be seen that any access to a peripheral device on the I/O bus imposes a substantial penalty on the performance of PC AT-compatible computers. This penalty will only become worse as the disparity between the local bus and I/O bus data rates continues to increase.

FIG. 1 depicts the important elements of a prior art PC AT-compatible computer architecture 10 which addressed the problem of the I/O bus access penalty with respect to one particularly speed-sensitive peripheral device, namely, a VGA video graphics controller 12. This particular computer system used an ET4000 VGA controller chip, manufactured by Tseng Labs, Newtown, Pa. The ET4000 is described in a data book entitled "ET4000 Graphics Controller High Performance Video Technology", published by Tseng Labs (1990), incorporated herein by reference. The VGA controller 12 shown in FIG. 1 includes this chip, the video memory, a DAC, and all associated circuitry. Although originally intended to be used in a standard configuration as a peripheral device on the I/O bus, the VGA controller 12 is nevertheless capable of operating at the high speeds of the local bus.

A VGA controller in the PC AT-compatible architecture is addressable in two address ranges: I/O ports are accessible at addresses 3B0–3DE in the I/O address space, and the video memory itself is accessible at addresses A0000–BFFFF in the main memory address space. In the original PC AT configuration, the VGA controller was located on the I/O bus and accesses to the I/O ports of the VGA controller occurred in the normal way for peripheral devices. That is, as mentioned above, the CPU issued an I/O read or write command and the I/O interface circuitry recognized it and generated the appropriate signals on the I/O bus in order to read or write from the addressed I/O port on the VGA controller. In order to access the video memory directly, the CPU issued an ordinary read or write cycle on the local bus as if the video memory was physically attached to the local bus. The I/O interface circuitry decoded the address to determine that it was within the address range of video memory, and then generated the appropriate signals on the I/O bus to execute the read or write cycle. When the cycle completed, any data returned by the VGA controller on the I/O bus was transmitted to the local bus. The READY# signal, which would have been asserted to the CPU almost immediately if the video memory was physically on the local bus, is withheld until the I/O cycle is complete.

In the architecture 10 shown in FIG. 1, accesses to the I/O ports of the VGA controller 12 continue to occur via the I/O bus. That is, the VGA controller 12 responds to the control signals on the I/O bus, receives its addressing from the I/O bus, and transfers data via the I/O bus. Similarly, master accesses to or from either port of the VGA controller, as well as DMA data transfers to or from video memory, also continue to occur via the I/O bus. Direct accesses by the CPU to or from video memory, however, occur directly from the local bus.

Referring to FIG. 1, the architecture 10 includes a CPU 20, which may be an Intel 80386SX microprocessor. Importantly, the CPU 10 has only a 16-bit external data bus and a 24-bit address bus. The CPU 20 is coupled to a local bus 22, together with a main memory array 24. The local bus 22 includes, among other things, 16 data lines CD(15:0), address lines CA(23:1) and BHE# and BLE#. For convenience, when referring to multiple CPU address lines herein, the BLE# line is sometimes referred to by its shorthand equivalent, CA(0).

The architecture 10 also includes an I/O bus 30 which includes, among other things, 16 data lines SD(15:0), address lines SA(19:0), and various control lines. Various peripheral devices illustrated as 32 and 34 in FIG. 1 are attached to the I/O bus 30. Such devices may include, for example, a local area network (LAN) card, an IDE disk drive controller, a modem, and so on.

The architecture 10 also includes an I/O interface chipset 40 which implements the I/O interface circuitry referred to above. On the local bus side, it is bi-directionally connected to the address lines CA(23:1), BHE# and BLE#, as well as the data lines CD(15:0). On the I/O bus side, the I/O interface chipset 40 is bi-directionally connected to the address lines SA(19:0) and data lines SD(15:0). The I/O interface chipset 40 includes an Appian System 90/SX chipset, manufactured by Appian Technology, Sunnyvale, Calif. The chipset 40 also includes an MCS1# input which can be activated by external circuitry to inhibit the performance of an I/O bus cycle in response to a local bus command which would otherwise be interpreted by the chipset 40 as requiring such an I/O bus cycle. It is believed that the MCS1# input was originally intended to be activated by a coprocessor which was present on the local bus instead of the I/O bus.

The VGA controller 12 includes, among other things, a partially multiplexed address/data port. On this port, pins DB(15:0) carry 16 data bits multiplexed with the low order 16 bits of an address, and pins A(19:16) carry four higher order address bits. These pins are connected to a dedicated VGA bus 44, different from both the local bus 22 and the I/O bus 30. As described in the above-mentioned Tseng Labs databook, the VGA controller 12 further includes the following signal lines for connecting to the remainder of the system:

| | | |
|---|---|---|
| CDMW# | Input | Memory Write signal for writing data to display memory. Typically connected to I/O bus MEMW# line. |
| ADMR# | Input | Memory Read signal for reading data from display memory or BIOS ROM. Typically connected to I/O bus MEMR# line. |
| MIOW# | Input | I/O Write signal for writing to VGA control registers. Typically connected to I/O bus IOW# line. |
| CIOR# | Input | I/O Read signal for reading from VGA control registers. Typically connected to I/O bus IOR# line. |
| WAIT# | Output | Memory or I/O read/write access should be stretched until this signal deactivates. Typically used to generate I/O bus READY line (i.e., IOCHRDY) |
| ADRE# | Output | Enables low order 16 address signals onto DB(15:0). Typically, controls buffers which enable the I/O bus address onto DB(15:0), but used differently in the FIG. 1 architecture as hereinafter described. |
| RDMH# | Output | Enables upper 8-bits of external bi-directional buffer coupling data lines with DB(15:8). Typically controls a buffer which enables coupling of DB(15:8) with the I/O bus data lines SD(15:8), but used differently in the FIG. 1 architecture as hereinafter described. |
| RDML# | Output | Enables low order 8-bits of external bi-directional buffer coupling data lines with DB(7:0). Typically controls a buffer coupling DB(7:0) with the I/O bus data lines SD(7:0) but used differently in the FIG. 1 architecture as hereinafter described. |
| DIR | Output | Signal for controlling the direction of bi-directional buffers coupling DB(15:0) with a data bus. 1 indicates a memory or I/O read from the VGA controller 12; 0 indicates a memory or I/O write to the VGA controller 12. |
| CS16# | Output | Identifies the VGA controller 12 as supporting 16-bit memory accesses. Typically connected to I/O bus MEMCS16# line. |
| IO16# | Output | Identifies the VGA controller 12 as supporting 16-bit I/O accesses. Typically connected to I/O bus IOCS16# line. |
| AEN# | Input | I/O address valid input. Typically connected to I/O bus AEN# line. |
| SBHE# | Input | Together with SA(0), indicates whether 8- or 16-bit access is intended. Typically connected to receive I/O bus SBHE# line, but connected differently in the architecture of FIG. 1. |
| SFDB# | Output | 16-bit memory access enable. Same as CS16# but generated earlier. Not used in typical PC-AT compatible computer; used in FIG. 1 architecture to generate an early CS16# type signal which is used for video memory accesses during DMA and master cycles. |
| ROME# | Output | Enable signal for external video BIOS ROM. |

Octal 3-state buffers 50, 52 and 54 couple address lines from the local bus 22 onto the VGA bus 44. In particular, when enabled, buffer 50 couples local bus address lines CA(19:16) onto VGA bus lines A(19:16), buffer 52 couples local bus address lines CA(15:8) onto VGA bus lines DB(15:8), and buffer 54 couples local bus address lines CA(7:0) onto VGA bus lines DB(7:0).

Bi-directional buffers 56 and 58 can further couple data bi-directionally between the data lines of the local bus 22 and the corresponding lines of VGA bus 44. In particular, the local bus side of bi-directional buffer 56 is connected to local bus data lines CD(15:8), and the local bus side of buffer 58 is connected to local bus data lines CD(7:0). The VGA bus side of bi-directional buffer 56 is connected to VGA bus lines DB(15:8), and the VGA bus side of bi-directional buffer 58 is connected to VGA bus lines DB(7:0).

Additional octal buffers 60, 62 and 64 are provided to couple address lines from the I/O bus 30 onto the VGA bus 44. In particular, buffer 60, when activated, couples I/O bus address lines SA(19:16) onto VGA bus lines A(19:16), buffer 62 couples I/O bus address lines SA(15:8) onto VGA bus lines DB(15:8), and buffer 64 couples I/O bus address lines SA(7:0) onto to VGA bus lines DB(7:0). Two additional bi-directional octal buffers 66 and 68 are provided to couple data signals bi-directionally between the VGA bus 44 and the I/O bus 30. In particular, the I/O bus side of bi-directional buffer 66 is coupled to I/O bus data lines SD(15:8), and the I/O bus side of bi-directional buffer 68 is connected to I/O bus data lines SD(7:0). The VGA bus side of bi-directional buffer 66 is connected to VGA bus lines DB(15:8), and the VGA bus side of bi-directional buffer 68 is connected to VGA bus lines DB(7:0).

In a standard system, in which all addresses and data for VGA controller 12 are communicated via the I/O bus 30, buffers 50, 52, 54, 56, 58 and 60 are unnecessary and the Output Enables (OE#) for buffers 62, 64, 66 and 68 are driven by the VGA-generated ADRE#, ADRE#, RDMH# and RDML# signals respectively. In the architecture of FIG. 1, these output enables are driven instead by newly defined signals BADRE#, BADRE#, BRDMH# and BRDML# respectively. The output enables (OE#) for buffers 50, 52, 54, 56, 58 and 60 are connected to receive respective newly defined signals LOCAL#, LADRE#, LADRE#, LRDMH#, LRDML# and BUS#. The directional inputs to bi-directional buffers 56, 58, 66 and 68 are all connected to receive the DIR signal generated by the VGA controller 12, as would the equivalent of bi-directional buffers 66 and 68 in a standard architecture.

The OE# signals identified above for the above buffers are all generated by a group of three programmable logic devices and some additional random logic devices in response to the control signals generated by the VGA controller 12, and in response to various signals on the local and I/O buses 22 and 30. The MCS1 signal provided to I/O interface chipset 40 is also generated by such devices. A fourth PLD generates CS16#, substituting for that normally generated by VGA controller 12. All of these signals derive at least in part from a decode of the address lines on the local bus 22 which indicates whenever a local bus access is being performed to or from any address in the video memory address range A0000-BFFFF, and from a decode of I/O bus addresses to the VGA I/O port addresses.

In operation, buffers 60, 62, 64, 50, 52 and 54 are generally enabled to thereby place any address supplied by CPU 20 onto the VGA bus 44. Memory addresses to the video memory range A0000-BFFFF are supplied through buffers 50, 52 and 54 directly from the local bus 22, and all other memory and I/O addresses are supplied through buffers 60, 62 and 64 from the I/O bus 30. Addresses which do not appear on I/O bus 30, and which are not within the video memory address range, are not provided to the VGA bus 44. If an I/O bus cycle occurs which seeks to access any of the I/O ports on VGA controller 12, VGA controller 12 recognizes the I/O address on SA and, through the PLDs and other logic, controls the BADRE#, BRDMH#, BRDML# and DIR signals to respond as required to the I/O bus cycle. The VGA controller 12 is, during this time, essentially disconnected from the local bus 22. Master bus cycles and any DMA cycles which access the VGA I/O ports also occur in this manner. Similarly, if a local bus access occurs to an address outside the video memory address range, the VGA controller 12 remains essentially disconnected from the local bus 22.

If a local bus access occurs to or from an address which is within the video memory address range A0000-BFFFF, the PLDs and associated logic activate the MCS1# input to the I/O interface chipset 40. The chipset 40, which would otherwise have decoded the address, withheld the CPU's READY# signal, and initiated an access to the video memory on the I/O bus 30, is thereby inhibited from doing so. Instead, the OE# signals for the buffers shown in FIG. 1 are controlled to essentially couple the VGA bus 40 to the local bus 22 and to disconnect it from the I/O bus 30. This logic circuitry, in addition to the VGA controller 12, controls the operation of the buffers 50, 52, 54, 56 and 58 such that the VGA controller 12 responds to the video memory access as if it were physically present on the local bus 22. When the access is complete, one of the PLDs generates an MRDY1# signal to the chipset 40. The chipset 40 activates the READY# line to the CPU 20, and the VGA controller 12 returns to listening on the I/O bus 30.

If an access occurs to or from an address which is within the video BIOS address range, typically C0000h-C8000h, the chipset 40 recognizes this and may initiate a standard AT cycle on the I/O bus 30 for accessing the video BIOS ROM. In a standard architecture, where the VGA controller is physically on the I/O bus, the VGA controller decodes the address on the I/O bus itself in order to generate a ROME# ROM enable signal for the video BIOS ROM. This procedure continues to be used in the architecture of FIG. 1 since, as explained above, the video ROM BIOS addresses which appear on I/O bus 30 will be passed to the VGA controller 12 via buffers 60, 62 and 64.

The FIG. 1 architecture operates, as mentioned above, only with an 80386SX (or lesser) CPU, which has only a 24-bit address bus and 16-bit data bus. The technique incurs a problem when an attempt is made to extend the concept for use with a CPU and local bus which has 32 data lines instead of 16. This is the trend in the personal computer market today, with the advent of such 32-bit external data bus microprocessors as the Intel 80386DX and 80486. These microprocessors also have a 32-bit address bus. The natural extension of the FIG. 1 technique would therefore require adding two more bi-directional buffers similar to 56 and 58 to accommodate the additional data lines and one additional uni-directional buffer similar to 50, 52 or 54 to accommodate the additional address lines. Counting these buffers, the natural extension of the FIG. 1 architecture for a 32-bit external data bus microprocessor therefore requires a total of 13 buffer chips. In addition, further programmable logic and other random logic control circuitry may also be required. Such a large number of chips in an industry moving toward reducing the number of chips required to implement a computer, may in effect prohibit the use of the FIG. 1 technique on newer computers.

The parent application describes an architecture by which a video controller such as a VGA controller is coupled to perform all its accesses over the local bus. Peripheral interface circuitry is provided for detecting any access on the local bus to the video controller, including accesses to an I/O port on the video controller. When an access to an I/O port on the video controller is detected, the peripheral interface circuitry couples the I/O address from the local bus to the video controller directly. Data is also coupled directly between the local bus and the video controller. That is, whereas the video controller continues to receive its control signals over the I/O bus, the I/O address and all data are transmitted via the local bus directly. Such a system can be implemented using only 6 or 7 buffer chips for a 32-bit system, far fewer than the 13 required using the natural extension of the FIG. 1 technique.

FIG. 2 shows a functional block diagram of significant components of one type of a PC AT-compatible computer system architecture 100 according to the invention of the parent application. The embodiment of FIG. 2 is based on an Intel 80486 CPU, but an Intel 80386DX CPU can also be used. The architecture 100 includes a local bus 110, an I/O bus 112, an I/O interface chipset 114 coupled between the local bus 110 and the I/O bus 112, and a VGA controller 12. The interface chipset 114 may include an 82C491, 82C493 and 82C206 available from Opti, Inc., and the VGA controller may be the same ET-4000 device as in the architecture of FIG. 1. Two local bus devices, namely a CPU 116 and an up-to 64 MB main memory array 118, are coupled to the local bus 110, and various peripheral devices 120 and 122 are coupled to the I/O bus 112. The architecture 100 also includes an X-bus 154, which is used primarily for 8-bit devices such as a keyboard controller 124 and a port controller 126. The X-bus is coupled to the I/O interface chipset 114, and contains 16 address lines XA(15:0) and 8 data lines XD(7:0), as well as control lines. The X-bus 154 is also coupled to VGA BIOS ROM 156, the output enable input of which is coupled to receive a ROME# signal from the VGA controller 12.

Unlike the CPU 20 in FIG. 1, the CPU 116 in FIG. 2 is an Intel 80486, which has a 32-bit external data bus and a 32-bit address bus. The local bus 110 therefore includes 32 data lines CD(31:0), 30 high order address lines CA(31:2) and four Byte Enable lines BE#(3:0). The I/O bus 112, on the other hand, is similar to the I/O bus 30 in FIG. 1 and includes the control signal lines described above.

The architecture 100 further includes a VGA bus 130 which is similar to the VGA bus 44 in FIG. 1 in that it includes 16 data lines multiplexed with 16 low order address lines. The VGA bus 130 further includes 8 additional dedicated high order address lines. The VGA controller 12 is connected to the VGA bus in the same manner as it was connected to the VGA bus 44 in FIG. 1. Other peripheral devices addressable in the I/O address space, such as a SCSI bus controller, can also be connected to the VGA bus 130, but for the purpose of the present discussion, it will be sufficient to describe an embodiment in which VGA controller 12 is the only such device.

The high-order 8 address lines of the VGA bus 130, A(23:16), are connected directly to receive address lines CA(23:16) from the local bus 110. No buffering is required. The next 8 local bus address bits CA(15:8) are coupled via a 3-state buffer 140 to VGA bus lines DB(15:8), and the low-order local bus address lines CA(7:0) (with a CA(1:0) encoded from BE#(3:0)) are coupled via 3-state buffer 142 to VGA bus lines DB(7:0). High-order local bus data lines CD(31:24) are coupled bi-directionally with VGA bus lines DB(15:8) via bi-directional 3-state buffer 144, and local bus data lines CD(23:16) are coupled bi-directionally with VGA bus lines DB(7:0) via bi-directional 3-state buffer 146. Similarly, local bus data lines CD(15:8) are coupled bi-directionally with VGA bus lines DB(15:8) via bi-directional 3-state buffer 148, and local bus data lines CD(7:0) are coupled with VGA bus lines DB(7:0) via bi-directional 3-state buffer 150. In addition to these buffers, an additional bi-directional 3-state buffer 152 is coupled between VGA bus lines DB(15:8) and DB(7:0) for performing byte swapping. Importantly, no path is provided for coupling data or addresses directly between the VGA bus 130 and the I/O bus 112. The unidirectional buffers 140 and 142 may be 74F244s and the bi-directional buffers 144, 146, 148, 150 and 152 may be 74F245s.

Three-state buffers 140 and 142 each include an OE#, and both are connected to receive an ADRE# signal. Bi-directional buffers 144, 146, 148 and 150 also each include an OE# input, and they are connected respectively to receive LRDMH2#, LRDML2#, LRDMH1# and LRDML1# signals. Buffers 144, 146, 148 and 150 also each include a DIR input, all of which are connected to receive a DIR signal. Bi-directional buffer 152 also has an OE# input, which is connected to receive an LRDMSW# signal, and a DIR input, also coupled to receive the DIR signal.

The DIR signal is generated by VGA controller 12 and is the same DIR signal as described above. The ADRE# signal, too, is generated by VGA controller 12 and is the same ADRE# signal as described above. If other peripherals such as 124 or 126 are included on the VGA bus, then the DIR and ADRE# signals would have to be generated by combining signals from each of those devices. The LRDML1#, LRDMH1#, LRDML2#, LRDMH2# and LRDMSW# signals are all generated by control circuitry 170 according to the following logic formulas:

| | |
|---|---|
| !LRDMH2# = ROME# & | !BE3# & BE1# & (!RDMH# + !RDML# & BE2# + !RDMH# & !BE2# & LOCAL# & CA0); |
| !LRDMH1# = ROME# & | !BE1# & (!RDMH# + !RDML# & BE0# + !RDML# & !BE0# & LOCAL# & CA0); |
| !LRDML2# = ROME# & | !RDML# & !BE2# & (BE1# & BE0# & !LOCAL# + BE0# & LOCAL# & !CA0 + BE0# & !BE3# & LOCAL# & CA0 & !BS8#); |
| !LRDML1# = ROME# & | !BE0# & !RDML# & (!LOCAL# + LOCAL# & !CA0 + LOCAL# & CA0 & !BE1# & !BS8#); |
| !LRDMSW# = ROME# & | RDMH# & !RDML# & (!BE1# & BE0# + !BE3# & BE2# & BE1# & BE0# + LOCAL# & !BE1# & CA0 + LOCAL# & !BE3# & CA0). | where:
ROME is the complement of the ROME# signal generated by VGA controller 12 to indicate a memory access to external VGA ROM BIOS,
BE#(3:0) are the Byte Enable lines on the local bus,
RDMH# and RDML# are generated by VGA controller 12 to enable coupling between the DB lines of the VGA controller 12 and respectively the high and low bytes of an external data bus, and
CA0 is generated by interface circuitry 114 from a decode of the BE#(1:0) lines.

As used herein, '#' indicates an active low signal, '!' is the NOT operator, '&' is the AND operator, and '+' is the OR operator. '!' occurs before '&', which occurs before '+'.

The LOCAL signal referred to in these formulas, roughly speaking, is active for CPU accesses to an address which is in the video memory address range. It is generated by the control circuitry 170 according to the following formula:

```
!LOCAL# =  !CA31 & !CA28 & !CA27 & !CA26 & !CA25
           & !CA24 & !CA23 & !CA22 & !CA21 &
           !CA20 & CA19 & !CA18 & CA17 & LM/IO#
           & D/C# & !HLDA & SFDB#.
``` where
- CA(31, 28:17) are address lines on the local bus,
- LM/IO# is the Memory/IO control line on the local bus (0=I/O cycle, 1=memory cycle),
- D/C# is the data/control signal on the local bus (1=data cycle, 0=control cycle),
- HLDA is the Hold Acknowledge signal on the local bus, and
- SFDB# is the early 16-bit memory access enable generated by VGA controller 12.

The BS8# signal referred to above is generated only during I/O read accesses to the controller and indicates that the controller supports 8-bit accesses only. It is generated by the control circuitry 170 according to the following equation:

!BS8# = !RDML#&!LM/IO#&!W/R#, where W/R# is the local bus W/R# signal.

Control circuitry 170 also generates a VA0 and a VA1 signal for the VGA bus 130, according to the following formulas:

```
!VA1 =  !BE1# + !BE0#
!VA0 =  !LOCAL# & ( !BE0# + !BE2# & BE1# )
        + LOCAL# & !CA0 & ( !BE0# + !BE2# & BE1# )
        + LOCAL# & CA0 & !BS8# & ( !BE0# + !BE2# &
        BE1# )
```

FIG. 3 shows three programmable logic devices (PLDs) used by control circuitry 170 to generate the enable signals for the buffers of FIG. 2. As shown in FIG. 3, these devices include one 20L8 172 and two 16L8s 174 and 176. These PLDs generate various signals, but only those inputs and outputs pertinent to an understanding of the invention of the parent application are shown. In particular, PLD 172 receives CA(31, 28:17), SFDB#, D/C#, HLDA, and LM/IO# from the local bus. PLD 172 generates, among other things, the LOCAL# signal used as described above. PLD 172 also generates an M16# signal which is active low or Hi-Z and is enabled according to the formula:

```
enable M16 =  !CA31 & !CA28 & !CA27 & !CA26 & !CA25
              & !CA24 & !CA23 & !CA22 & !CA21 &
              !CA20 & CA19 & !CA18 & CA17 & LOCAL#
              & SFDB#.
```

PLD 174 receives the LM/IO#, HLDA and W/R# signals from the local bus, ROME#, RDMH# and RDML# from the VGA controller 12, and an ATCYC4 signal from the chipset 114. The chipset-generated ATCYC4 signal indicates generally that an AT bus cycle is requested. PLD 174 generates BS8# as described above. PLD 174 also generates an ATCYC signal from the formula:

ATCYC=ATCYC4+LOCAL#&!ATCYC1-#+ATCYC2 where

!ATCYC1#=!W/R#&!RDMH#
 &ROME#+!W/R#&!RDML#&ROME#

ATCYC2=HLDA&!RDMH#+H-LDA&!RDML#.

The PLD 176 receives the LOCAL# signal, the BS8# signal and the RDML# signal as inputs. It also receives RDMH#, RMOE#, CA0, and BE#(3:0). The PLD 176 generates the five output enable signals for the bi-directional buffers 144, 146, 148, 150 and 152 as described above, as well as SBHE#, VA0 and VA1.

Each of the programmable logic devices 172, 174 and 176 may also generate additional signals for use for other purposes in the system, not relevant here.

The control circuitry 170 also includes a 16R6 PLD 180 which is connected as a 4-state state machine to generate the following signals:

| | |
|---|---|
| VMEMW# | Connected to CDMW# line of VGA controller 12. Provides timing for a write access to VGA display memory. |
| VMEMR# | connected to ADMR# line of VGA controller 12. Provides timing for a read access to VGA display memory. |
| RDYO# (or VRDYI#) | ANDed with a WRDYI# signal from an optional coprocessor and provided to chipset 114 to indicate the end of a local bus cycle. |
| BS16# | Connected to BS16# line of local bus to indicate to CPU 116 that VGA bus has 16, not 32, data lines. |

The states are defined using state bits [Q1,Q0], and the state transitions are defined as follows:

| State | Transition |
|---|---|
| 1 1 | if !ADS# then 1 0 else 1 1 |
| 1 0 | if !LOCAL# then 0 0 else 1 1 |
| 0 0 | goto 0 1 |
| 0 1 | goto 1 1 |

From the above states, the PLD 180 generates its output signals according to the following formulas:

```
!VMEMW# =  Q1# & Q0# & !ADS# & W/R# & !WAITSEL#
           + Q1# & !Q0# & !LOCAL# & W/R#
           + !VMEMW# & !LOCAL# & RDYO
!VMEMR# =  Q1# & Q0# & !ADS# & !W/R# & !WAITSEL#
           + Q1# & !Q0# & !LOCAL# & !W/R#
           + !VMEMR# & !LOCAL# & RDY
!RDYO#  =  !Q1# & !Q0# & WAIT# & !LOCAL# & RDYO#
           & RDY# & !WAITSEL#
           + Q1# & Q0# & LWAIT# & !LOCAL# &
           RDYO# & RDY# & (!VMEMR# +
           !VMEMW#)
!BS16#  =  !LOCAL# & RDY# & (!VMEMR# +
           !VMEMW#)
!LWAIT# =  !WAIT#
```

In these formulas, LWAIT is a synchronous version of the WAIT signal generated by VGA controller 12 and RDY# is the local bus READY# line. WAITSEL is a jumper-selected signal for choosing between 3 and 5 wait state operation. VMEMW# and VMEMR# are fast versions of the standard I/O bus MEMW# and MEMR# signals, indicating a write or read request to a memory resource (such as VGA controller 12) on the I/O bus. VMEMW# and VMEMR# are synchronized to the high speed local bus clock, whereas MEMW# and MEMR# are synchronized to the 8 MHz I/O bus clock.

In accordance with the above, the significant control lines of VGA controller 12 are connected as follows:

| | |
|---|---|
| CDMW# | Connected to the VMEMW# output of control circuitry 170. |
| ADMR# | Connected to the VMEMR# output of control circuitry 170. |
| MIOW# | Connected to I/O bus IOW# line (conventionally). |
| CIOR# | Connected to I/O bus IOR# line (conventionally). |
| WAIT# | Connected to an input to control circuitry 170, which activates the I/O bus CHRDY line if WAIT# is inactive either during an access to the VGA I/O ports, or during a DMA or MASTER access to video memory. Also used by control circuitry 170 in the generation of timing signals VMEMW#, RDYO#, and BS16#. |
| ADRE# | Connected to enable input of buffers 140 and 142 to enable the low order 16 local address signals onto DB(15:0). In the conventional design this signal enabled the I/O address signals onto DB(15:0), and in the FIG. 1 architecture this signal enabled selectably the local bus address signals or the I/O bus address signals onto DB(15:0). |
| RDMH# RDML# | Used by control circuitry 170 to generate the LRDML1#, LRDML2#, LRDMH1#, LRDMH2# and LRDMSW# signals (FIG. 2), which control the coupling between the local bus data lines and DB(15:0). In the conventional architecture RDMH# and RDML# controlled the coupling between the I/O bus data lines and DB(15:0), and in the FIG. 1 architecture they controlled the coupling between selectably the local bus data lines or the I/O bus data lines, and DB(15:0). |
| DIR | Connected to bi-directional buffers 144, 146, 148 and 150 (FIG. 2) to control the direction of data transfer between the local bus and DB(15:0). Controlled the direction of data transfer between the I/O bus and DB(15:0) in the conventional architecture, and between either the local bus or the I/O bus and DB(15:0) in the FIG. 1 architecture. |
| CS16# | Connected to receive the M16# signal generated by control circuitry 170 and connected to I/O bus MEMCS16# line. |
| IO16# | Connected to the I/O bus IOCS16# line. |
| AEN# | Connected to always indicate to the VGA controller 12 that the I/O address is valid, except in circumstances not here relevant. |
| SBHE# | Generated by control circuitry 170 from the local bus address according to the formula !BE3# + !BE1#. |
| SFDB# | Used by control circuitry 170 to generate the LOCAL# and M16# enable signals. |
| ROME# | Connected to enable external video BIOS ROM 156 (FIG. 2). |

When used in a conventional system, in addition to I/O accesses, the chipset 114 itself decodes accesses to memory addresses which are physically on the I/O bus (such as video memory addresses A0000–BFFFF) and automatically generates an I/O bus cycle to accomplish the read or write. To do this, the system controller (82C491 or 82C493) chip in the chipset 114 activates an ATCYC# signal which it provides to a data bus controller (82C392) chip in the chipset 114. The data bus controller chip responds by transmitting data from the local bus to the I/O bus if the access is a write access, or from the I/O bus to the local bus if the access is a read access. The system controller chip also includes an LDEV# input which, when activated, will inhibit an I/O cycle which the system controller chip would otherwise have generated. LDEV# is typically used by a coprocessor located physically on the local bus.

In the architecture of FIG. 2, however, substitute signals are generated for both LDEV# and ATCYC#. As shown in FIG. 8, the coprocessor LDEV# signal, identified in FIG. 8 as WLDEV#, is ANDed with the LOCAL# signal generated by PLD 172 (FIG. 3) by an AND gate 114A, to generate a substitute signal provided to the LDEV# input of system controller chip 114B. Similarly, the ATCYC# output of system controller 114B is provided to the ATCYC4 input of PLD 174 (FIG. 3), which generates the substitute ATCYC# signal as described above and provides it to the ATCYC# input of data bus controller 114C (FIG. 8).

In an access to video memory in the architecture of FIG. 2, PLD 172 (FIG. 3) decodes the address and activates the LOCAL# signal. This in turn activates the LDEV# signal (FIG. 8), which inhibits the I/O cycle which otherwise would have been generated by system controller 114B. The ATCYC# output of the system controller 114B also remains inactive, as does the substitute ATCYC# output of PLD 174. Accordingly, the data bus controller 114C does not transmit any data through itself, between the local bus 110 and the I/O bus 112 in response to the video memory access. Instead, data and addresses are coupled directly between the local bus 110 and the VGA bus 130 via buffers 140, 142, 144, 146, 148 and 150 (FIG. 2) as previously described. (For DMA and Master accesses to video memory, the ATCYC# signal generated by PLD 174 controls the proper direction of transfer.)

In an access to the I/O ports of VGA controller 12, LDEV# is not activated and the system controller 114B does activate its ATCYC# output. If the access is a write access, the data bus controller 114C transmits the data superfluously from the local bus 110 to the I/O bus 112 in addition to the coupling from the local bus 110 directly to the VGA bus 130 as previously described. On a read access, however, the PLD 174 does not activate its ATCYC# output and thereby prevents the data bus controller 114C from transmitting data from the I/O bus 112 to the local bus 110. Only the data coupled by buffers 144, 146, 148 and 150 is driven onto the local bus 110 as previously described.

FIG. 4 is a timing diagram showing the operation of the architecture 100 for a CPU read access to video memory in the VGA controller 12. FIG. 4 shows three separate memory accesses, namely, a 3 wait state video memory read cycle 402, a non-local device cycle 404 which is not to an address in video memory, and a standard 5 wait state video memory read cycle 406.

As previously explained, 3-wait state video memory read cycles take place when WAITSEL is set by jumper to 0, and 5-wait state video memory read cycles occur when WAITSEL is set by jumper to 1. The sequence of cycles shown in FIG. 4 is therefore somewhat hypothetical since the jumper position of WAITSEL would have to have been changed before cycle 406. The non-local device cycle 404 assumes WAITSEL=0. Identified by a waveform 408 is the local bus clock signal CLK. For convenience, each rising edge of the waveform 408 is given a time designation T1-T16. The waveform 410 shows the ADS# signal generated by CPU 116, and the waveform 412 shows changes in the address/status lines of the local bus. This includes CA(31:2), BE#(3:0), D/C#, W/R#, M/IO# and HLDA. Waveform 414 shows the LOCAL# signal generated by PLD 172 (FIG. 3), and waveform 416 shows the VMEMR# signal generated by PLD 180. The WAIT# signal generated by VGA controller 12 is shown as waveform 418, and the LWAIT# signal generated and used internally by PLD 180 in response to the WAIT# signal is shown as waveform 420. The RDYO# signal generated by PLD 180 to indicate the end of a local bus cycle is shown as waveform 422, and the RDY# signal generated by chipset 114 to indicate to the CPU 116 that the cycle is complete, is waveform 424. Waveform 426 shows the BS16# signal generated by PLD 180 to indicate to the CPU 116 that the VGA bus has 16, not 32, data lines. Waveform 428 shows the ADRE# signal generated by VGA controller 12 to enable the low order 16 local address lines onto DB(15:0) of the VGA bus 130, and waveform 430 shows the RDMH#/RDML# signal generated by VGA controller 12 to enable coupling of respectively the high or low order 8 bits of the DB lines on VGA bus 130. RDMH# and RDML# will be simultaneous since the VGA controller 12 is configured for 16-bit rather than 8-bit, memory accesses. Waveform 432 shows either LRDMH2#/LRDML2# or LRDMH1#/LRDML1#, depending on the address, generated by PLD 176 in response to the RDMH#/RDML# signals. Finally, waveform 434 shows the information present on DB(15:0) of VGA bus 130, and waveform 436 shows when the data read from the video memory is present on the local bus CD(31:16) or CD(15:0) data lines. Line 438 in FIG. 4 indicates the state Q1#, Q0# of the state machine in PLD 180 after each rising edge of the clock signal 408.

As shown in FIG. 4, at time T1, all the control signals are in their inactive state except ADRE#. Accordingly, VGA controller 12 and control unit 170 do not at this time affect the operation of other parts of the system, but merely listen to the address lines on local bus 110. The state machine in PLD 180 is in its rest state of 1 1.

Sometime prior to T2, it is assumed that the CPU 116 places valid video address and status information on the address/status lines as shown in waveform 412. This includes CA=0A0000h-0BFFFFh, D/C#=1, W/R#=0, M/IO#=1, and HLDA=0. The CPU 116 then activates the ADS# signal as shown in waveform 410, to start a video memory read cycle. As shown in waveform 414, the valid video memory address and status information causes the PLD 172 to activate its LOCAL# output, which in turn causes PLD 180 to activate its BS16# signal for the CPU 116. The low order 16 video address bits from CA(15:0) are also coupled onto DB(15:0) on VGA bus 130 via buffers 140 and 142 (FIG. 2), as shown in waveform 434, CA(23:16) being connected directly to the high order 8 address lines on the VGA bus 130 as shown in FIG. 2.

At time T2, since ADS# is active (low), the PLD 180 state machine changes to state 1 0. Since WAIT-SEL=0, PLD 180 also activates VMEMR# at time T2 as shown in waveform 416. This occurs regardless of whether LOCAL# is active, but as will be seen in relation to the non-local access cycle 404, VMEMR# will return high at time T3 if LOCAL# is not active. Activation of VMEMR# in turn causes ADRE# to deactivate and RDMH#/RDML# to activate, which in turn causes PLD 176 to activate LRDMH2#/LRDML2# or LRDMH1#/LRDML1#, as shown in waveforms 428, 430 and 432. Removal of ADRE# causes the buffers 140 and 142 (FIG. 2) to stop driving the video address onto DB(15:0), as shown in waveform 434, making DB(15:0) available to carry the data read from video memory. Activation of LRDMH2#/LRDML2# or LRDMH1#/LRDML1# couples any data on DB(15:0) onto either CD(31:16) or CD(15:0), via buffers 144/146 or 148/150, respectively.

Prior to time T3, CPU 116 deactivates ADS#. At time T3, the state machine in PLD 180 changes to state 00 and at time T4, it changes to state 0 1. By time T5, the data from the video memory is expected to be present on DB(15:0) and coupled to the local bus data lines as shown in waveforms 434 and 436. Accordingly, at time T4, in response to the PLD 180 state machine being at state 0 0 just prior to the rising edge of CLK, PLD 180 activates the RDYO# signal as shown in waveform 422 to prepare to end the cycle.

At time T5, in response to RDYO# being low, chipset 114 activates the RDY# signal to indicate to CPU 116 that the video memory read request has now been serviced and valid data is on the local bus CD lines. Activation of the RDY# signal also causes PLD 180 to deactivate the BS16# signal as shown in waveform 426.

At time T6, the state machine in PLD 180 remains at 1 1. Chipset 114 also deactivates the RDY# signal, and PLD 180 deactivates the VMEMR#. The deactivation of VMEMR# causes VGA controller 12 to deactivate RDMH#/RDML# as shown in waveform 430, and to activate ADRE# as shown in waveform 428. As a result, buffers 140 and 142 turn on to couple future address bits from the local bus 110 onto the VGA bus DB(15:0) lines as shown in waveform 434. Deactivation of RDY# also causes the CPU 116 to place the next address on the address/status lines which, as shown in waveform 412 is assumed to be a non-video memory address. In fact, it is assumed to be a cache read cycle. The CPU 116 also initiates the cycle by activating ADS# as shown in waveform 410. Since the new address is a non-local address, PLD 172 deactivates the LOCAL# signal as shown in waveform 414, which in turn deactivates all the LRDM— signals shown in waveform 432. This turns off buffers 144, 146, 148 and 150 so that the cache memory can drive the data lines of local bus 110 as shown in waveform 436.

Since cycle 404 is a cache read cycle, it is complete in two clock cycles. Accordingly, the chipset 114 activates the RDY# line for the CPU 116 in response to T7 (and independently of RDYO#), and deactivates it in response to T8. The PLD 180 activates VMEMR# during cycle 404, but it is ignored by the remainder of the logic. Additionally, the non-video address appears on DB(15:0) as shown in waveform 434, but has no effect there since it is not recognized by the VGA controller 12 or control unit 170.

Upon completion of cycle 404, the CPU 116 is assumed to place another video address on the local bus 110 CA lines along with appropriate status signals, all as shown in waveform 412. The CPU 116 also activates ADS# to begin cycle 406. Cycle 406 is the same as cycle 402 except that, as mentioned above, WAIT-SEL=1. The various control and data signal transitions are substantially the same as in cycle 402, except that prior to time T12, the VGA controller 12 activates the WAIT# signal. In response, PLD 180 activates the internal LWAIT# signal at time T12, which delays the activation of RDYO# and everything which depends on RDYO#. Assuming the VGA controller 12 inserts only one wait state, it will deactivate WAIT# prior to time T13. PLD 180 therefore deactivates LWAIT# at time T13, and at time T14, activates the RDYO# signal. At time T15, since RDYO# is low, chipset 114 activates RDY# for the CPU 116 to indicate that the cycle will be complete at time T16. Also, although not shown in FIG. 4, the VGA controller 12 activates the DIR signal provided to buffers 144, 146, 148 and 150 during cycles 402 and 406 in order to specify the appropriate direction of data coupling from the VGA bus 130 to the local bus 110.

Memory write accesses to video memory proceed substantially the same as memory read accesses, the only major differences being that VMEMW# is generated rather than VMEMR#, valid write data is provided on the local bus CD lines at the beginning of the cycle instead of toward the end, and the write data reaches the VGA bus 130 DB lines as soon as ADRE# goes inactive and LRDMH2#/LRDML2# or LRDMH1#/LRDML1# goes active rather than toward the end of the cycle. Additionally, the DIR signal generated by VGA controller 12 is opposite.

FIG. 5 shows a typical data read cycle from the I/O port of VGA controller 12. Such reads are typically 8-bit cycles, so an 8-bit read cycle 502 is shown.

In this timing diagram, the local bus clock signal is shown as waveform 504. Only portions of the CLK waveform representing the beginning and end of the cycle are shown in waveform 504, since all the intermediate timing depends on the I/O bus peripheral rather than the local bus clock. The ADS# signal from the CPU 116 is shown as waveform 506, and the address/status lines of the local bus 110 are shown as waveform 508. Waveform 510 shows the substitute ATCYC# output of PLD 174 (FIG. 10), and waveform 512 shows the I/O bus IOR# signal generated by chip set 114. Waveform 514 shows the ADRE# signal generated by VGA controller 12. Waveform 516 represents the RDMH#/RDML# signals generated by the VGA controller 12. If CA0=1, then the top line of this waveform represents the RDMH# signal and the bottom line represents the RDML# signal. If CA0=1, then the top line represents the RDML# signal and the bottom line represents the RDMH# signal.

Waveform 518 shows the I/O bus CA0 signal generated by the chipset 114 in response to the BE#(3:0) signals on the local bus 110. Waveform 520 shows the LOCAL# signal generated by PLD 172, and waveform 522 shows the VA0 signal generated by PLD 176. Waveforms 524, 526 and 528 show the LRDML2#/LRDML1# signal, the LRDMH2#/LRDMH1# signal, and the LRDMSW# signal, respectively, all generated by PLD 176. Waveform 524 represents the LRDML2# signal if the access is to an even byte in the high order 16 bits of a 32-bit word, and represents LRDML1# if the access is to an even byte in the low order 16 bits of a 32-bit word. Similarly, waveform 526 represents the LRDMH2# signal if the access is to an odd byte in the high order 16 bits of a 32-bit word, and represents LRDMH1# if the access is to an odd byte in the low order 16 bits of a 32-bit word. Each of the signals 524, 526 and 528 show their behavior separately for CA0=0 and CA0=1.

Waveform 530 shows the information which is present on the DB(15:0) lines of VGA bus 130, and waveform 532 shows the information which is present on the appropriate eight data lines of the local bus 110. Waveform 534 shows the BS8# signal generated by PLD 174 to indicate to the CPU 116 that the addressed I/O port can handle only 8-bit read accesses, and waveform 536 shows the RDY# signal generated by the chipset 114 to indicate completion of the cycle to the CPU 116.

As can be seen, prior to time T2, the CPU places valid address/status information on the local bus 110 as shown in waveform 508, and activates ADS# as shown in waveform 506. The chipset 114 generates the CA0 signal as shown in waveform 518 in response to the address/status information in waveform 508, and the PLD 176 in turn generates the VA0 signal as shown in waveform 522. Additionally, since ADRE# is active as shown in waveform 514, the video I/O address from the local bus 110 is also coupled to the DB(15:0) lines of VGA bus 130 via buffers 140 and 142 (FIG. 2) as shown in waveform 530. ADS# remains low until the rising edge of the next local bus clock cycle, that is, T3.

Some time later, the chipset 114 activates the I/O bus 112 IOR# signal to indicate that a read request is being made to a resource on the I/O bus. The VGA controller 12 recognizes this and deactivates ADRE# as shown in waveform 514 and activates the appropriate one of RDMH#/RDML# as shown in waveform 516. The PLD 176 then in turn activates the appropriate one of LRDML2#/LRDML1#/LRDMH2#/LRDMH1# as shown in waveforms 524 and 526, and if appropriate also activates LRDMSW# as shown in waveform 528. PLD 174 also removes the substitute ATCYC# signal (waveform 510) in response to activation of RDMH#/RDML#, and also activates the BS8# signal as shown in waveform 534. Removal of the substitute ATCYC# signal at this time prevents the chipset 114 from driving the data lines of local bus 110 with data which it expects to have received over the I/O bus 112.

Thereafter, the VGA controller 12 places the requested data from the I/O port onto the DB(15:0) lines of VGA bus 130 as shown in waveform 530, and this information is coupled directly onto local bus 110 via one of the buffers 144, 146, 148 or 150 as shown in waveform 532. Chipset 114 subsequently terminates the I/O read cycle by deactivating IOR# as shown in waveform 512. This causes VGA controller 12 to reactivate ADRE# as shown in waveform 514 and to deactivate RDMH#/RDML# as shown in waveform 516, which in turn makes the DB(15:0) lines of VGA bus 130 again available for address information as shown in waveform 530. It also causes PLD 174 to re-activate ATCYC#. Deactivation of RDMH#/RDML# also causes PLD 176 to deactivate LRDML2#/LRDML1#/LRDMH2#/LRDMH1# and LRDMSW# as shown in waveforms 524, 526 and 528, which in turn causes buffers 144, 146, 148 and 150 to stop driving video I/O read data onto the data lines of local bus 110 as shown in waveform 532. PLD 174 also deactivates BS8# at this time as shown in waveform 534. Chipset 114 also notifies the CPU 116 that the cycle is concluding by activating the RDY# line at time T13 and deactivating at time T14 as shown in waveform 536.

FIG. 6 shows a video I/O port write cycle. Since write accesses to the I/O port of the VGA controller 12 are usually 16-bit accesses, a 16-bit write cycle 602 is shown in FIG. 6. As in FIG. 5, FIG. 6 shows the local bus clock waveform 604, the ADS# signal 606, the address/status waveforms 608, and ATCYC# 610. Instead of IOR# signal 512, which remains high during the entire write cycle, FIG. 6 shows IOW# waveform 612. It also shows ADRE# waveform 614, RDMH#/RDML# waveform 616, CA0 waveform 618, LOCAL# waveform 620, VA0 waveform 622, LRDML2#/LRDML1# waveform 624, LRDMH2#/LRDMH1# waveform 626, LRDMSW# waveform 628, waveform 630 indicating the information on DB(15:0) of the VGA bus 130, waveform 632 indicating the information on the local bus data lines CD(31:16) or CD(15:0), whichever is appropriate, the BS8# waveform 634, and the RDY# waveform 636.

As with the read cycle 502, before the write cycle 602 begins, the CPU 116 places a valid video I/O address and control signals on the CA and status lines of local bus 110 as shown in wave form 608. The control signals include D/C#=1, W/R#=1, M/IO#=0, and HLDA=0. The video I/O address is coupled to the DB(15:0) lines of VGA bus 130 by buffers 140 and 142 (FIG. 2) as shown in waveform 630, since the ADRE# output of VGA controller 12 is low as shown in waveform 614. The CPU 116 also places the video I/O write data on local bus 110 data lines CD(31:16) or CD(15:0) as shown in waveform 632, depending on whether the write access is to the high order 16 bits of a 32-bit word, or the low order 16 bits of a 32-bit word, respectively. CPU 116 also activates the local bus ADS# signal (waveform 606) to indicate that valid information is now on the local bus. PLD 174 keeps the BS8# signal inactive (high) as shown in waveform 634 for the entire cycle 602. The chipset 114 accomplishes the write in two 8-bit I/O bus accesses, first writing the low order 8 bits and then the high order 8 bits.

Accordingly, as shown in waveform 618, the chipset 114 first outputs a low CA0 (waveform 618), and the PLD 176 responds by outputting a low VA0 (waveform 622). Thereafter, the chipset 114 begins the first I/O bus write cycle by activating IOW# line as shown in waveform 612. The VGA controller 12 responds by activating ADRE# (waveform 614) and RDML# (waveform 616). PLD 176 responds by activating LRDML2#/LRDML1# (waveform 624), whichever corresponds to the 16-bit portion of the 32-bit local bus data lines carrying the data, thereby causing either buffer 146 or buffer 150 to couple onto DB(7:0) the low-order 8 bits of the 16 data bits to be written (waveform 630). The video I/O address had previously been removed due to the deactivation of ADRE# (waveform 614). The ATCYC# signal remains active for the entire cycle 602 (waveform 610), and LOCAL# remains inactive for the entire cycle 602 (waveform 620).

After the write data settles on DB(7:0), chipset 114 deactivates IOW# (waveform 612). The VGA controller 12 then reactivates ADRE# (waveform 614) to return the video I/O address to DB(15:0), and also deactivates RDML# (waveform 616). PLD 176 responds to the deactivation of RDML# by deactivating. LRDML2#/LRDML1# (waveform 624). As shown in waveform 618, the chipset 114 at this time also brings CA0 high in order to send the next byte of write data to the high order byte of the 16-bit VGA I/O port. PLD 176 also brings VA0 high at this time (waveform 622).

After the video I/O address settles on DB(15:0), the chipset 114 again activates IOW# (waveform 612). The VGA controller 12 deactivates ADRE# (waveform 614) and this time activates RDMH# instead of RDML# (waveform 616). The PLD 176 accordingly activates the appropriate one of LRDMH2#/LRDMH1# (waveform 626), instead of LRDML2#/LRDML1#, and also activates LRDMSW# (waveform 628) in order to copy DB(15:8) onto DB(7:0) via swap buffer 152. Deactivation of ADRE# and activation of LRDMH2#/LRDMH1# causes buffers 140 and 142 to remove the address from DB(15:0) and causes one of the buffers 144 or 148 to couple the write data onto DB(15:8) as shown in waveform 630.

Finally, after the write data has stabilized on DB(15:0), the chipset 114 deactivates IOW# (waveform 612), causing VGA controller 12 to reactivate ADRE# (waveform 614) and deactivate RDMH# (waveform 616). Deactivation of RDMH# causes PLD 176 to deactivate LRDMH2#/LRDMH1# (waveform 626) and LRDMSW# (waveform 628). Deactivation of LRDMH2#/LRDMH1# and reactivation of ADRE# then causes the buffers 140, 142, 144, 146, 148 and 150 to remove the write data from the VGA bus 130 and once again couple the low order 16 address bits from the local bus 110 onto VGA bus 130 (waveform 630).

As with read cycle 502, in anticipation of the end of the write cycle 602, chipset 114 activates the RDY# signal on the local bus 110 one local bus clock cycle prior to the completion of the access, and then returns RDY# to its inactive level on the next rising edge of the clock signal (waveform 636). The CPU 116 thereafter removes the video I/O address, control and write data signals from the local bus 110 (waveforms 608, 632).

Accordingly, it can be seen that for both the I/O read cycle 502 and the I/O write cycle 602, though all the normal I/O bus 112 control signals are generated by I/O interface chipset 114 (FIG. 2), the address and data information are coupled directly between the VGA bus 130 and the local bus 110 rather than between the VGA bus 130 and the I/O bus 112. It should be noted that although I/O chipset 114 may as a matter of course transmit address and data information from the local bus 110 onto the I/O bus 112 during this process, such information does not traverse the I/O bus 112 in order to reach the VGA controller 12. Only the control signals on I/O bus 112 are coupled to VGA controller 12.

Modularity Considerations

Another advantage of the invention of the parent application becomes apparent in embodiments which divide a traditional mother board into two or more boards to provide modularity of components. As shown in FIG. 7, the components on a traditional mother board can be divided into two separate boards, a base board 710 and a CPU board 712. Major components included on the base board 710 are the data bus controller (82C392) 714 (one of the chips in the I/O interface chipset 114 (FIG. 2)), an integrated peripheral controller 716 (e.g. 82C206), a keyboard controller 718, DRAM main memory 720, a plurality of AT bus connectors 722 for expansion slots, a keyboard connector 724 and a speaker connector 726.

Various CPU boards 712 are available for attaching to the base board 710 via respective special connectors 730 (on the CPU board 712) and 732 (on the base board 710). The CPU boards 712 can offer a variety of options, including either a 386DX or 486 CPU 734, an optional VGA controller 12, and an optional cache memory subsystem 738. The CPU board 712 also includes the system controller chip in the chipset (e.g. 82C491 or 82C493).

If the modular system of FIG. 7 implements an architecture which uses the VGA controller 12 conventionally, that is, coupled to the I/O bus only, then both the local bus and the I/O bus must be present on both boards. The local bus must be present on the CPU board since it must connect to the CPU 734, and it must be present on the base board 710 since it must connect at least to DRAM 720. The I/O bus must be present on the CPU board 712 since it is connected to the VGA controller 12, and must of course be present on the base board 710 at least for connection to the AT connectors 722. The same is true if the modular organization of FIG. 9 implements an architecture like that of FIG. 1.

If the modular design of FIG. 7 implements the architecture of FIG. 2, however, then the VGA controller 12 does not require the presence of the I/O bus data lines on the CPU board 712. These lines therefore need not be communicated from one board to the other via the special connectors 730 and 732, thereby significantly reducing the number of pins required in such connectors. This, too, is a significant benefit of the architecture of FIG. 2.

Much of the history of attempts to couple peripheral devices to a local bus instead of to the I/O bus is described in Slater, "Local Buses Poised to Enter PC Mainstream", Microprocessor. Report (Jul. 8, 1992), pp. 7-13, incorporated herein by reference. As set forth therein, several vendors have attempted different techniques for doing so, in addition to the FIG. 1 and FIG. 2 techniques described above. Graphics chip vendors have also tried incorporating features into their chips for connection directly to a local bus. For example, see S3, Inc., "86C911 GUI Accelerator", Databook (April 1992), incorporated herein by reference.

However, these solutions all suffer from the problem that they are non-standard. That is, if a vendor of I/O interface chipsets provides for a local bus capability, there is no assurance that it will interface directly with products made by more than one peripheral device controller vendor. A layer of buffers and glue logic therefore may be required to enable such peripheral device controllers to take advantage of the local bus feature, and the glue logic may be different for each different peripheral controller. On the other hand, if a maker of peripheral device controllers, such as a maker of a VGA controller, provides for a local bus capability in the peripheral controller, there is no guarantee that it will interface correctly with the I/O interface chipsets made by more than one chipset manufacturer. Again, different buffers and glue logic may be required for each vendor of chipsets.

In one effort for ameliorating the above problem, instead of creating a private standard, S3 Corp. publicized its local bus interface protocol and attempted to promulgate it as a standard for the entire personal computer industry. As described in these articles, the S3 standard involved creation of an ACI (Advanced Component Interconnect) bus which would interface with any number of different microprocessors, and any number of peripheral device controllers, all under the control of an S3 chipset. Another attempt to address this problem is the PCI bus described in Intel Corp., "Peripheral Component Interconnect (PCI), revision 1.0 Specification" (Jun. 22, 1992). As described therein, the PCI bus is separated from the local bus by a "PCI Bridge and DRAM Controller" which is intended to provide a uniform set of PCI bus signals for use with most of the Intel microprocessors. Both the ACI bus and the PCI bus are separated electrically from the CPU bus, but carry many of the same signals.

The ACI and PCI buses are attempts to promulgate chip-level standards for coupling peripheral devices to the local bus. In this sense, should they become industry standards, they will provide common targets for makers of peripheral controllers who want to include local bus capability in their chips. The standards do not attempt to define a connector, however, so such peripheral interface controller chips would have to be included on the system motherboard (or on a modular building block board as described above), when each system is built. The standards do not facilitate an aftermarket, such as that which has developed for AT and EISA cards, into which controller manufacturers can sell local bus accessory cards.

One factor which limits the ability to design a connector for local bus accessory cards is the trend toward miniaturization of personal computers. The addition of local bus connector slots of any description would require either enlargement of the motherboard and/or exterior housing, or elimination of an equivalent number of slots for standard I/O peripheral accessory cards. Neither alternative is desirable.

SUMMARY OF THE INVENTION

According to the invention, roughly described, one or more of the standard ISA connector sockets is replaced by a connector structure which carries both ISA signals and local bus signals. The connector structure is arranged such that a standard ISA accessory card may be inserted, in which case only ISA signals are coupled to or from the card. The ISA card functions exactly as if it were inserted into a standard ISA connector socket. New "local bus" accessory cards may also be designed for insertion into such a connector, however, and these cards may connect to one or more signal lines of the local bus either additionally or instead of connections made to the ISA bus. By physical or other means, ISA accessory cards are prevented from unintentional contact with local bus signal connector contacts.

BRIEF DESCRIPTION OF THE DRAWINGS

The invention will be described with respect to particular embodiments thereof, and reference will be made to the drawings, in which:

FIG. 11A is a top view of the socket of FIG. 11;

FIG. 12 is a side plan view of a local bus card having an edge connector according to the present invention;

FIGS. 12A and 12B are close-up views of connection pads on the card of FIG. 12;

FIG. 13 is a symbolic diagram indicating contact pin locations of a socket according to the present invention;

FIG. 14 is a logic diagram of a portion of an I/O interface chip which may be used with the present invention;

FIGS. 15A and 15B show arrangements for the use of certain signals with the present invention;

DETAILED DESCRIPTION

Various types of connector structures would suffice for implementing the invention, including a structure having two edge card sockets disposed in end-to-end relationship with each other. In such a structure, one socket can be a standard ISA socket carrying standard ISA signals, and the second socket can be of any variety, carrying the new local bus signals. Standard ISA cards would then plug into only the first socket, whereas local bus cards would plug into both sockets.

In another embodiment, the connector structure is an industry standard EISA connector socket with many of its electrical contacts redefined. The choice of an EISA socket for accepting ISA and local bus cards is advantageous in part because of their small footprint, and because EISA sockets are readily available and are already familiar to system designers and OEMs. The mechanical characteristics of the EISA connector are described in European Patent Application Publication No. 0 379 176 (Jul. 25, 1990), and in BCPR Services, Inc., "EISA Specification", ver. 3.11 (1990), both incorporated herein by reference.

Figure 9:
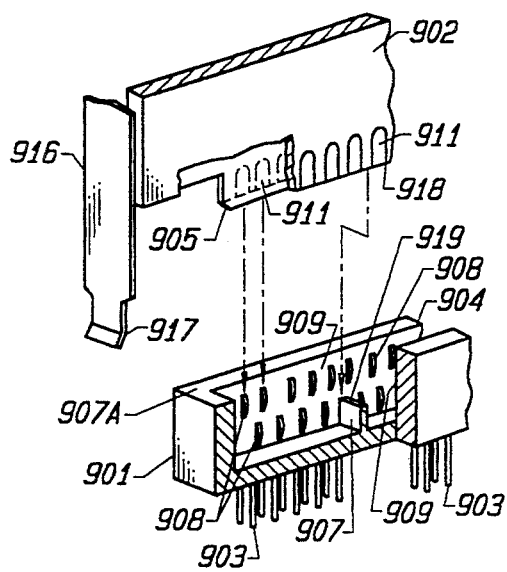
FIG. 9 is a partially cutaway perspective view of an ISA card and socket connector combination implementing the present invention.

Referring to FIG. 9 hereof, an accessory circuit card 902 is illustrated. The accessory circuit card 902 comprises a backplane installation bracket 916 which has an alignment tongue 917 configured to assist in the alignment of the printed circuit board (PCB) card and to mechanically secure the PCB to the computer chassis. Grounding connections may also be made through bracket 916. For illustration purposes, an 8- or 16-bit ISA accessory card 902 is shown aligned for insertion into socket 901. The socket is a female connector which has spring loaded contacts 908 spaced to align with the exposed metal pads 911 on the accessory circuit card 902. In one embodiment, the contacts 908 and the exposed metal pads 911 are gold-plated to minimize the electrical contact resistance associated with a mechanical connector.

As further illustrated in FIG. 9, the contacts 908 extend downward and form solder pins 903 which are used to mechanically and electrically secure edge connector socket 901 to the printed circuit board by means of wave soldering or other similar soldering techniques.

The edge connector socket 901 comprises a molded plastic box with an elongated rectangular opening along its upper surface. Although this surface is referred to herein as the upper surface, it will be understood that this is only for convenience of description and that the socket may actually be oriented in any direction. The slot along the upper surface accommodates the card edge connector. Edge connector 901 socket has contact pads 908 on opposite interior walls 909. Edge connector socket 901 further comprises transverse walls 907 which act as stops or rests for 8- 16-bit ISA card edge connectors while providing mechanical strength to the socket.

As may be more fully appreciated from an inspection of FIG. 9, an upper level and lower level of contacts 908 are positioned in the interior 909 of socket 901. In the embodiment illustrated, the upper of contacts are spaced 0.10 inch apart in order to maintain compatibility with the industry standard architecture (ISA) and accessory cards which were built to conform to the industry standard architecture pin spacing. The lower level of contacts 908 are also spaced 0.10 inch apart and are offset from the upper row of contacts such that lines drawn perpendicular to the socket and passing through the center of each contact in each row of contacts are spaced 0.05 inch apart. The contact pads in the two rows are thus in a staggered configuration. This configuration can best be seen in FIG. 11 wherein the contacts which comprise lower row 920 are offset 0.05 inch from the contacts comprising upper row 922.

Referring again to FIG. 9, it will be seen that socket 901 is provided with card stop partition 907 which limits the travel of an ISA card 902 as it is inserted into socket 901. When an ISA card 902 is fully inserted into socket 901, lower edge 918 of the PCB of card 902 rests upon upper surface 919 of partition 907. Socket 901 is provided with a plurality of card stop partitions so as to fully support card 902 when inserted and to prevent any rocking motion of the card. The height of partition 907 within the cavity of socket 901 is selected such that when fully inserted into the socket, none of the conductive pads 911 touch the contacts of the lower row of contacts 908. In this way, an EISA card socket accommodates ISA accessory cards.

The EISA socket, however, has a deeper cavity than standard ISA sockets to accommodate a second row of contacts. In one embodiment, the cavity has a depth of 0.5 inch, whereas a conventional socket for ISA edge connectors is typically 0.3 inch deep. The deeper cavity of the EISA socket does make the longer walls of the socket more susceptible to flexing in and out, but card stop partitions 907 additionally function to reinforce the walls of the socket and thereby contribute to the structural strength of the socket by resisting flexing of the socket walls. The distance from the upper surface of socket 901 to upper surface 919 of partition 907 is 0.3 inch, thereby providing the same insertion distance for ISA cards as conventional ISA card edge connector sockets.

Figure 10:
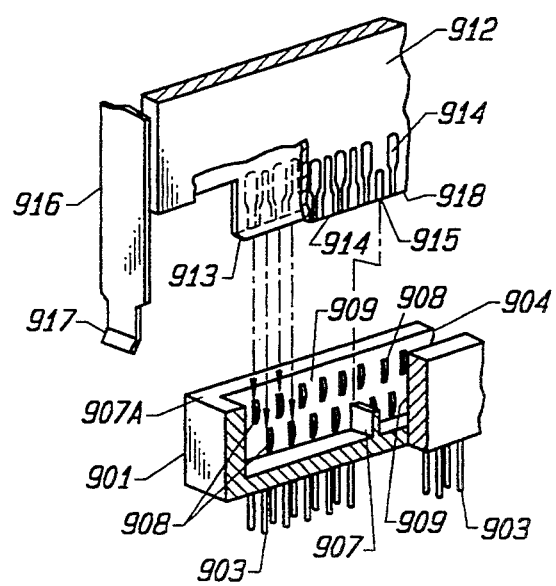
FIG. 10 is a partially cutaway perspective view of a local bus card and socket connector combination implementing the present invention.

FIG. 10 illustrates an a local bus card 912 aligned for insertion in socket 901. It will be noted that card edge connector 913 projects further from the PCB comprising the card than that of ISA card 902 illustrated in FIG. 9. As for EISA cards, the card edge connector of local bus card 912 projects 0.5 inch from the card.

As may be seen in FIG. 10, like an EISA card, a local bus card 912 is provided with grooves 915 along the lower edge of its card connector. Grooves 915 are sized and spaced to align with partition walls 907 in socket 901. In this way, local bus card 912 may be inserted fully into socket 901—i.e., inserted until the bottom edge of edge connector 913 contacts the bottom of the cavity. In contradistinction, accessory circuit cards conforming to ISA are not equipped with grooves 915 and are thereby prevented from being inserted to the same extent as a local bus card by card stop(s) 907.

Figure 11:
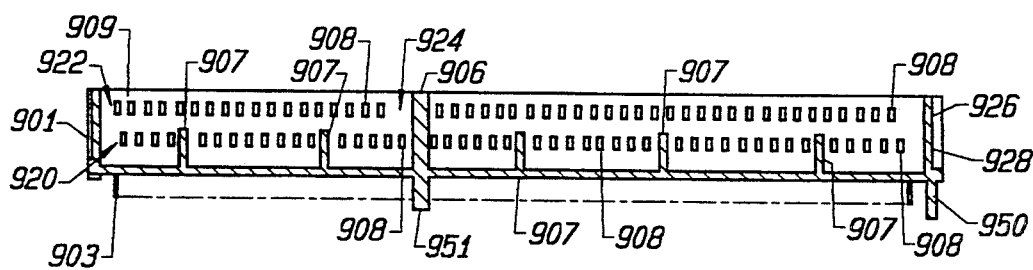
FIG. 11 is cross-sectional view of a socket according to the present invention.

Referring now to FIG. 11, socket 901 is shown in cross section. In the embodiment illustrated, partition 906 is shown which extends the full depth of the cavity. Partition or wall 906 provides correspondence to the socket dimensions of 8-bit ISA edge card connectors. The distance between wall 906 and inner surface 926 of end wall 928 is selected to be equal to the length of an 8-bit ISA edge card connector. In this way, an 8-bit (62-pin) ISA accessory card may be correctly aligned when inserted into the socket 901. Wall 906 also functions to ensure that accessory cards are inserted in socket 901 with the correct orientation. A keyway is provided in the card edge connectors of both 16-bit ISA cards and local bus cards to accommodate wall 906. Therefore, socket 901 does not have end-to-end symmetry and the correct orientation of the board for insertion is unambiguous.

It will be noted that there is no electrical contact 908 at position 924 of the socket illustrated in FIG. 11, in either opposing contact plane. This is because ISA cards having a 16-bit bus (98-pin edge connector) have a corresponding gap between the 8-bit bus portion (62-pin connector) and the 16-bit bus 36-pin extension. Thus a contact is not needed at position 924 to accommodate 16-bit ISA boards. An additional pair of opposing contacts could be provided at position 924 to furnish a corresponding additional pair of pads on a local bus accessory card.

FIG. 12 is a plan view of an accessory circuit board conforming to a local bus architecture. The board illustrated comprises an edge connector having a pin spacing of 0.05 inch, twice the density of conventional ISA cards. It will be noted that the card illustrated provides 90 more electrical connections than a conventional ISA card in the same length card edge connector. Notches or keyways 915 and 935 are sized and spaced to allow the edge connector to be fully inserted into the socket of the present invention despite the presence of card stops 907 and partition 906.

It can be seen in the edge connector illustrated that conductive pads 911 of the top row 940 are longer than the conductive pads 911 of bottom row 942. In the illustrated connector, the ratio of the lengths is 3:5 so higher current levels may be carried on certain ISA contacts.

The conductive pads of the lower row are provided with conductive extensions in order to make electrical connection to the printed wiring traces of the PCB. The conductive pads of the upper row may be provided with conductive extensions which reach to the edge of the card connector. Although not necessary to the practice of the subject invention, these extensions serve at least two purposes: 1) they provide electrical connection to the edge of the PCB for convenience in electroplating; and 2) they provide a relatively clean and smooth surface for contacting electrical contacts 908 of socket 901 during insertion of the card edge connector into the socket.

Pins 903 and contacts 908 of socket 901 are typically gold-plated to provide minimum contact resistance and freedom from oxidation. Likewise, conventional molding plastics may be used to fabricate socket 901.

FIG. 13 is a top view of the pins of an EISA-type connector socket 901 as they connect to a system PC board, viewed from the component side. The rows of pins labelled A, B, C and D represent contacts in the upper row 922, whereas the rows of pins labelled E, F, G and H represent contacts in the lower row 920 of the socket 901. Table I, below, details pin assignments for the use of an EISA-type connector for combined local bus-ISA bus purposes.

TABLE I

| | ROW F | ROW B | ROW E | ROW A |
|---|---|---|---|---|
| 1 | CA(2) | GROUND | GROUND | IOCHCK# |
| 2 | CA(4) | RESDRV | CA(3) | SD(7) |
| 3 | CA(6) | +5 V | CA(5) | SD(6) |
| 4 | CA(8) | IRQ(9) | CA(7) | SD(5) |
| 5 | +5 V | −5 V | CA(9) | SD(4) |
| 6 | Access Key | DRQ(2) | Access Key | SD(3) |
| 7 | CA(10) | −12 V | GROUND | SD(2) |
| 8 | CA(12) | NOWS# | CA(11) | SD(1) |
| 9 | CA(14) | +12 V | CA(13) | SD(0) |
| 10 | CA(16) | GROUND | CA(15) | CHRDY |
| 11 | +5 V | SMWTC# | CA(17) | AEN# |
| 12 | CA(18) | SMRDC# | GROUND | SA(19) |
| 13 | CA(20) | IOW# | CA(19) | SA(18) |
| 14 | CA(22) | IOR# | CA(21) | SA(17) |
| 15 | CA(24) | DACK#(3) | CA(23) | SA(16) |
| 16 | Access Key | DRQ(3) | Access Key | SA(15) |
| 17 | +5 V | DACK#(1) | CA(25) | SA(14) |
| 18 | DRAMS# | DRQ(1) | GROUND | SA(13) |
| 19 | RST4# | REFRESH# | GROUND | SA(12) |
| 20 | +5 V | BCLK | READY# | SA(11) |
| 21 | BE#(2) | IRQ(7) | BE#(3) | SA(10) |
| 22 | BE#(0) | IRQ(6) | BE#(0) | SA(9) |
| 23 | HRQ0 | IRQ(5) | GROUND | SA(8) |
| 24 | M/IO# | IRQ(4) | HLDA1 | SA(7) |
| 25 | Access Key | IRQ(3) | Access Key | SA(6) |
| 26 | W/R# | DACK#(2) | ADS# | SA(5) |
| 27 | +5 V | TC | D/C# | SA(4) |
| 28 | SCLK | BALE | RDYO# | SA(3) |
| 29 | LDEV# | +5 V | GROUND | SA(2) |
| 30 | CD(31) | OSC | CD(30) | SA(1) |
| 31 | CD(29) | GROUND | CD(28) | SA(0) |
| | ROW H | ROW D | ROW G | ROW C |
| 1 | CD(27) | W16# | GROUND | SBHE# |
| 2 | +5 V | IOCS# | CD(26) | LA(23) |
| 3 | CD(25) | IRQ(10) | CD(24) | LA(22) |
| 4 | CD(23) | IRQ(11) | CD(22) | LA(21) |
| 5 | CD(21) | IRQ(12) | CD(20) | LA(20) |
| 6 | Access Key | IRQ(15) | Access Key | LA(19) |
| 7 | CD(19) | IRQ(14) | CD(18) | LA(18) |
| 8 | CD(17) | DACK#(0) | CD(16) | LA(17) |
| 9 | CD(15) | DRQ(0) | GROUND | MRDC# |
| 10 | +5 V | DACK#(5) | CD(14) | MWTC# |
| 11 | CD(13) | DRQ(5) | CD(12) | SD(8) |
| 12 | CD(11) | DACK#(6) | CD(10) | SD(9) |
| 13 | CD(9) | DRQ(6) | CD(8) | SD(10) |
| 14 | CD(7) | DACK#(7) | GROUND | SD(11) |
| 15 | Access Key | DRQ(7) | Access Key | SD(12) |
| 16 | +5 V | +5 V | CD(6) | SD(13) |
| 17 | CD(5) | MASTER# | CD(4) | SD(14) |
| 18 | CD(3) | GROUND | CD(2) | SD(15) |
| 19 | CD(1) | | CD(0) | |

Most of the signals identified in Table I as local bus signals are the same as their corresponding signals on the CPU bus. In fact, assuming loading limits and other electrical restrictions are satisfied, they can be connected directly to the pins of the CPU. Alternatively, they can be separated from the CPU by buffers or latches, and "bridge" circuitry may be provided for arbitrating access to the local bus among different requestors, for posting writes across the local bus, for controlling a CPU-accessible cache memory independently of the local bus, or for coupling the CPU bus to the local bus asynchronously to permit differing bus clock frequencies. Several other signal designations are included on the local bus connector as follows.

DRAMS#. Asserted to the local bus accessory cards whenever CA(31:26) are all zero. DRAMS# is generated on the motherboard by a PLD or by the I/O interface chipset.

SCLK. Single-phase system clock, provided to the accessory card.

LDEV#. Local device indication. A local device card listens to the address and control lines on the local bus and, when it detects an access to which it can respond over the local bus, it asserts LDEV#. For CPU cycles, this signal must be valid by the end of the first T2 cycle. For non-CPU originated cycles (HLDA = 1), the local device card decodes LDEV# from the address lines CA and qualifies it by the ISA bus command signals MRDC#, MWTC#, IOWC# and IORC#, before asserting LDEV# to the local bus. The LDEV# signal is provided to the I/O interface chipset on the motherboard, which inhibits the performance of any ISA-bus cycle which would otherwise have been performed.

FIG. 14 is a logic diagram of a portion of the OPTi 82C496 chip, made by OPTi, Inc., Santa Clara, Calif., which is an I/O interface chip which contains local-bus support on-chip. The chip is described in OPTi, 82C496 Databook (Preliminary), version 1.2 (Jun. 1, 1992). Both the Databook and the chip are incorporated herein by reference.

Referring to FIG. 14, a buffered version of LDEV#, referred to as LDEVB, is inverted by an invertor 1402 to form an LDEV signal which is provided to one input of a three-input OR gate 1404. A second input of OR gate 1404 receives an I387 connected to the output of a three-input AND gate 1406, the inputs of which are connected to receive NPEXIST, A31, and MIOB signals. The remaining input of OR gate 1404 is connected to receive an FAF32 signal, which is connected to the output of an AND gate 1408. One input of AND gate 1408 is connected to the output of a three-input NAND gate 1410, coupled to receive MIO, DCB and WR signals derived from the CPU bus. The other input of AND gate 1408 is connected to receive an AF32 signal. The output of OR gate 1404 forms an MAF32 signal, which is provided to the D input of each of two flip-flops 1412 and 1414. The active low clear input of flip-flop 1412 is connected to an RST4B signal, which is a buffered version of the RST4# local bus signal. The active low preset input of flip-flop 1414 is connected to receive a signal which is the logical NOR of RST4 and T1. T1 is high only during T1 states of CPU cycles. The clock inputs of both flip-flops 1412 and 1414 are connected to receive T21B, which is low only during the first T2 state of CPU cycles.

The signals LDEV and AF32 are also provided to respective inputs of an OR gate 1416, the output of which is connected to the '1' input of a two-input multiplexer 1418, the '0' input of which is connected to the Q output of flip-flop 1414. The Q output of flip-flop 1412 forms an LAF32 signal which is provided to the AT-bus state machine (not shown). When high, LAF 32 causes the AT-bus state machine to abort or inhibit any AT-bus cycle which would otherwise have been generated in response to the current signals on the CPU or local bus. The select input of multiplexer 1418 receives the HLDA signal from the CPU, and the output of multiplexer 1418 forms an ATCYCB signal, which is used for buffer control between the local bus and the AT bus.

The circuitry of FIG. 14 accommodates several sources which might indicate that the AT-bus cycle should not be generated. First, if an Intel 80387 numeric coprocessor exists, then AND gate 1406 will output a logic 1. This causes MAF32 to go high, which subsequently brings LAF32 high to inhibit the I/O bus state machine. Also, since HLDA=0 for CPU cycles, MAF32=1 will also cause ATCYCB to go to its inactive high level. Certain other 32-bit and special cycles also inhibit the AT-bus state machine by means of NAND gate 1410 and AND gate 1408.

It can be seen that LDEVB, when asserted, will also inhibit the AT-bus state machine via OR gate 1404 and flip-flop 1412. If LDEV# was asserted in response to a CPU cycle, then the MAF32=1 signal is passed through flip-flop 1414 and multiplexer 1418 to inhibit transfers through the data buffers from the ISA bus to the local bus, and the same result occurs via the OR gate 1416 and multiplexer 1418 if LDEV# was asserted in response to a non-CPU cycle.

HROO; HLDA1. HRQO is a local bus ownership request to the motherboard from a local bus card. On the motherboard, this signal is ORed with DMA requests coming from the integrated peripherals controller (IPC) and provided to the system controller of the I/O interface chipset, where it arbitrates with refresh requests for ownership of the local bus. When the chipset determines that either HRQ or REFRESH desires control of the local bus, it asserts HOLD to the CPU if the CPU is connected directly to the local bus, or to a bridge circuit potentially separating the CPU from the local bus. When the CPU or bridge relinquishes control of the local bus, it does so by asserting HLDA back to the chipset which, after checking to ensure that the chipset, and not another device, asserted the HOLD, asserts HLDA1. If HRQ was asserted to the system controller chip in response to a hold request from the IPC, then the IPC detects HLDA1 and grants control of the local bus to the requesting device. If it was a local bus card which asserted the HRQ signal to the system controller chip, then the local bus card detects HLDA1 and becomes the local bus master. In some embodiments, several slot-specific HRQOs and/or HLDA1s can be provided, and arbitration can be included either on the motherboard or on the local bus boards.

RDYO#. At the conclusion of a CPU cycle to which a local bus card responded, the local bus card must activate the READY# input of the CPU (or of a bridge). The signals on the local bus connector permit the local bus to accomplish this in either of two ways. First, the local bus card can simply pull the local bus READY# signal low, which is connected directly to the CPU (or bridge) READY# input. This requires the local bus to three-state its READY# output whenever it is not being used, so that another device which is responding to a CPU cycle (e.g. the I/O interface chipset) may pull it low. This arrangement is shown in FIG. 15A, where the local bus card 1502 READY# signal connects directly to the RDYO# output of the chipset 1504, which in turn connects to the READY# input of a CPU 1506. If the local bus card does not three-state its ready output, then it should use the RDYO# local bus signal. As shown in FIG. 15B, the RDYO# signal from the local bus connector is connected to an RDYI# input of a chip in the chipset 1504, which includes the signal with the other logic which generates RDYO# to the CPU 1506.

Figure 16:
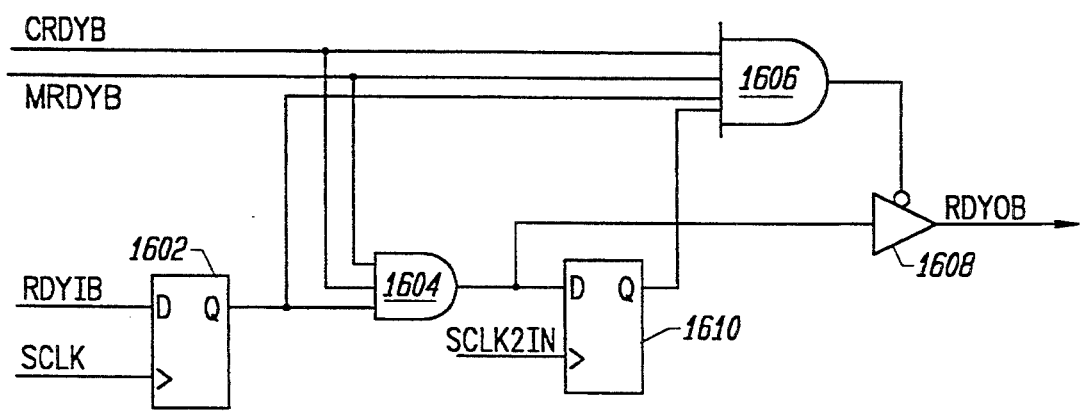
FIG. 16 shows a logic diagram of a portion of an I/O interface chipset which may be used with the present invention.

FIG. 16 shows a logic diagram of a portion of the 82C496 mentioned above, which generates RDYO# in response to RDYI# and other internal readies. It comprises a synchronizing flip-flop 1602, the D input of which RDYIB, which is a buffered version of RDYI#. The Q output of flip-flop 1602 is connected to one input of a three-input AND gate 1604 and one input of a four-input NAND gate 1606. Two other internally-generated ready signals, CRDYB and MRDYB, are also provided as inputs to both of the AND gates 1604 and 1606. The output of AND gate 1604 is connected to the input of a three-state buffer 1608, the output of which forms an RDYOB signal, which is buffered and provided to the RDYO# pin of the chipset. The output of AND gate 1604 is also connected to the D input of a flip-flop 1610, the Q output of which is connected to the fourth input of AND gate 1606. The output of AND gate 1606 is connected to the active low enable input of three-state buffer 1608. The clock input of flip-flop 1602 receives a signal which is equivalent to the SCLK signal, and the clock input of flip-flop 1610 receives a signal which is equivalent to a double-frequency SCLK signal.

In operation, it can be seen that after RDYIB passes through the synchronizer 1602, it is treated the same as either of the other internal readies CRDYB and MRDYB in the generation of RDYOB. In particular, if any one of the three signals goes low, then the outputs of both AND gates 1604 and 1606 will go low as well. This brings RDYOB, and therefore RDYO# low. One half-cycle later, the zero at the output of AND gate 1604 appears at the Q output of flip-flop 1610, where it has no immediate effect since the output of AND gate 1606 is already low. When the ready signal which went low returns high, the output of AND gate 1604 also returns high, bringing RDYOB high. The logic 1 at the output of AND gate 1604 is not transferred to the Q output of flip-flop 1610 until one half SCLK cycle later, so the AND gate 1606 output remains low for one half SCLK cycle after RDYOB returned high. Thus the chipset drives the CPU's READY# high actively for a short time after CRDYB, MRDYB or RDYIB was de-asserted. This helps the signal line recover quickly before the next clock cycle.

Figure 17:
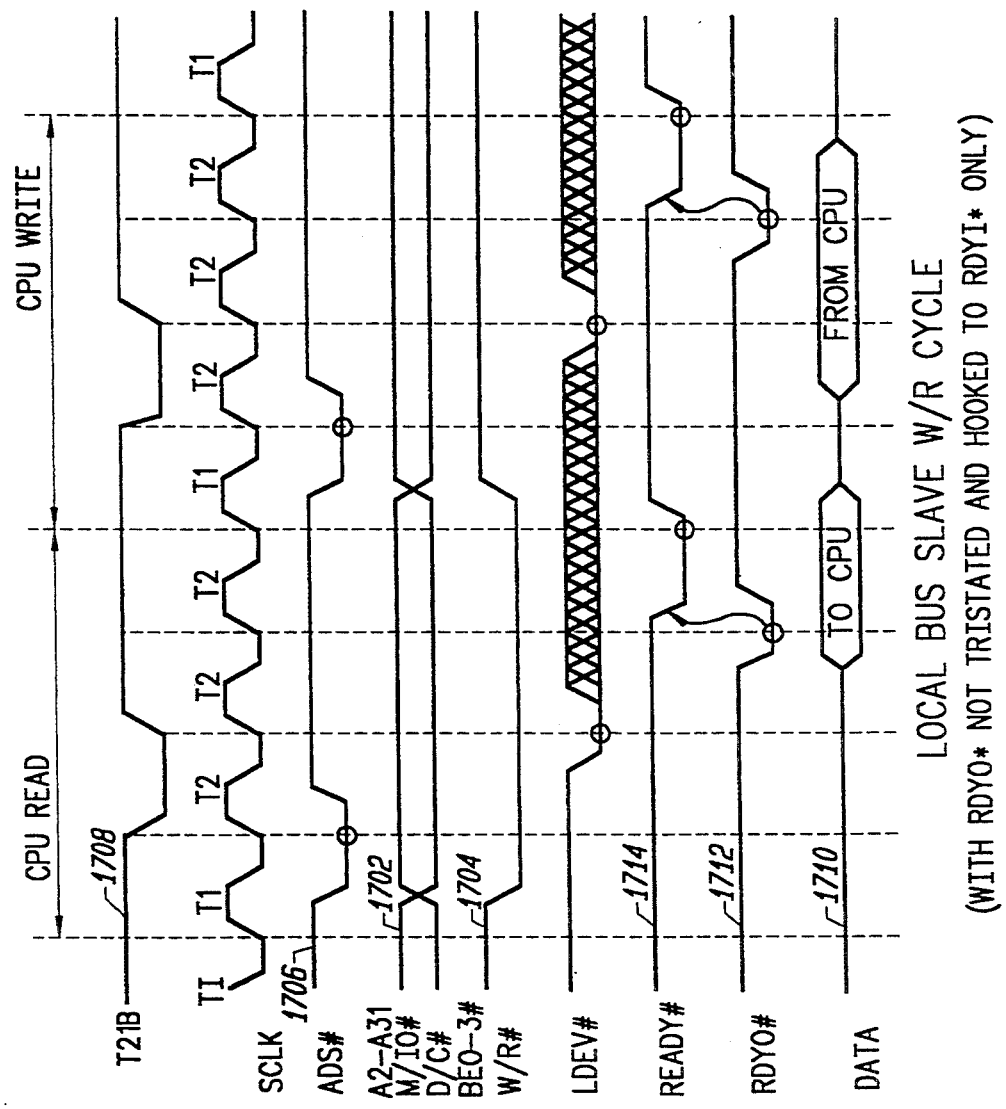
FIGS. 17 and 18 depict typical waveforms of signals in an implementation of the present invention.

FIG. 17 shows typical local bus waveforms for a CPU read cycle, followed by a CPU write cycle, to which a local bus slave card responds. This diagram illustrates the operation where the local bus card uses the local bus RDYO# signal instead of the READY# signal. During the first T1, the CPU sets up the address and cycle definition lines as shown in waveforms 1702 and 1704, and asserts ADS# as shown in waveform 1706. These are detected in response to the rising edge of SCLK for the first T2 cycle, and prior to the second T2 cycle, the local bus card asserts LDEV#, which is turn latched on the rising edge of the second T2. As indicated previously, the rising edge of T21B, shown in waveform 1708, triggers the latching of LDEV# by flip-flops 1412 and 1414 (FIG. 14). Any AT state machine cycle which would have been generated by the chipset is thereby inhibited. Some time later, for example during the second T2, the local bus card places the requested data on the local bus CD lines as indicated by waveform 1710, and asserts RDYO# to the chipset as indicated in waveform 1712. The chipset detects RDYO# at the beginning of the third T2, and asserts READY# to the CPU so that it can be sampled low at the beginning of the following SCLK cycle, thereby terminating the CPU read cycle. The local bus card must maintain the data on the CD lines until at least this time.

Similarly, for a CPU write access, the CPU sets up the address and control lines during T1 as indicated in waveforms 1702 and 1704, and asserts ADS# so that it can be sampled low by the local bus card at the beginning of the first T2. The CPU then places the write data onto the CD lines as indicated in waveform 1710. The local bus card asserts LDEV# in time for the second T2, thereby preventing the chipset from generating any AT cycle in response to the CPU access. After the local bus card has latched in the write data, it asserts RDYO#, in response to which the chipset asserts READY# to the CPU as indicated in waveform 1714. The CPU samples READY# low at the beginning of the next SCLK cycle, thereby terminating the CPU write cycle.

Figure 18:
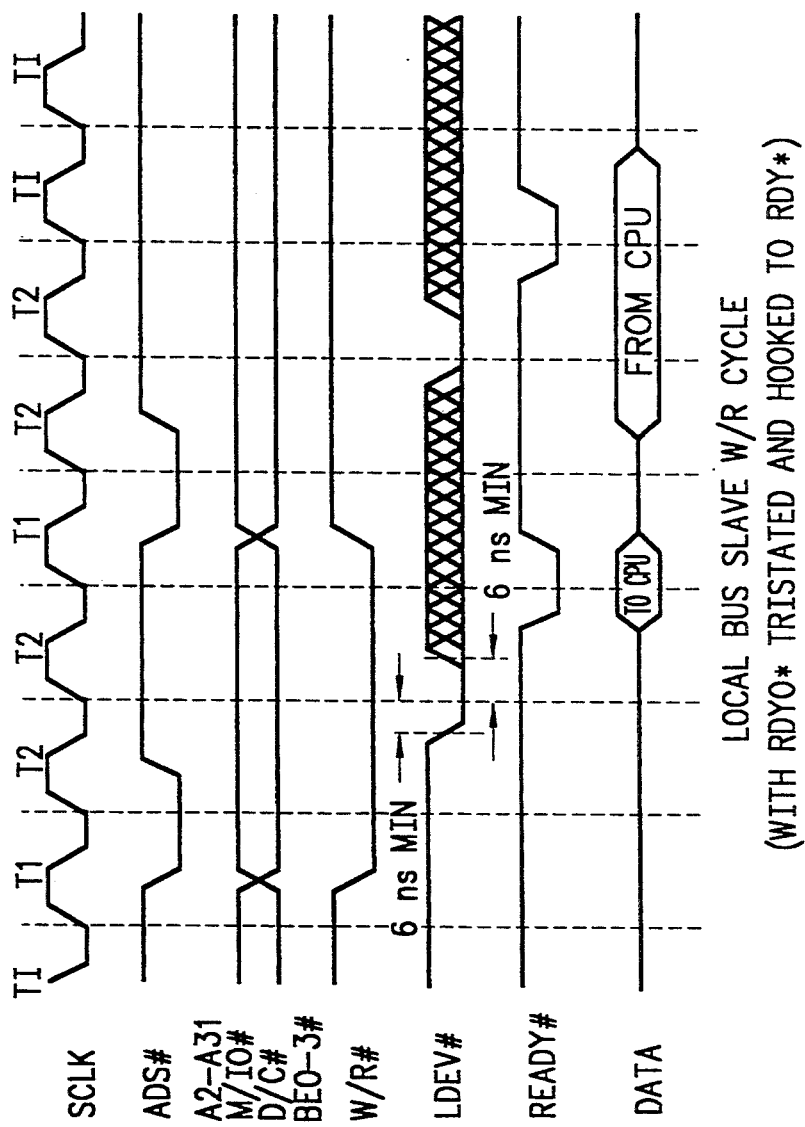

FIG. 18 shows typical waveforms for local bus signals where the local bus card uses the READY# local bus signal instead of RDYO#. It can be seen that the waveforms are similar to those in FIG. 17, except that RDYO# is not shown. Additionally, since the local bus card's ready signal does not need to pass through a flip-flop such 1602 (FIG. 16), both the read and write cycles can be completed in one fewer SCLK ticks.

The operation of the local bus where a local bus card is the master is similar, except that the local bus card must assert HRQO to the motherboard and await HLDA1 before proceeding. Cycles originated by a local device card can access main memory, in which case the memory responds as if the access was being made by the CPU. If the cycle originated by the local bus card defines a memory or I/O address physically on the ISA bus, then the I/O interface chipset responds by generating an appropriate cycle on the ISA bus and returning the results to the local device card via the local bus. Again, except for having performed any necessary arbitration for the local bus, asserting HOLD to the CPU, and returning HLDA1 to the local bus card, the I/O interface chipset need not know that the cycle was originated by a local device card rather than by the CPU. Further, a second local bus card may assert LDEV# to the I/O interface chipset if it detects that the access is to an address for which it can respond on the local bus. Again, neither the I/O interface chipset nor the second local device card needs to know that the local bus cycle was originated by a first local device card rather than the CPU.

As can be seen from the above Table I, there are a number of CPU bus signals which are not represented on the local bus connector. These include CA(31:26), BS8, BS16 and HLDA. Additionally, it may be desirable to provide local bus cards with the CA0 signal generated by the motherboard chipset. On the other hand, the ISA contacts on the local bus connector include certain signals which are rarely, if ever, used by ISA expansion cards. These include DRQ(0, 3, 5, 6), DACK(0, 3, 5, 6) and IRQ(11, 12). Accordingly, advantageously, the local bus connector signal definitions may be altered to provide the extra local bus signals on the ISA contacts, in place of the ISA signals which really are not needed. Table II below sets forth these signal definition modifications.

TABLE II

| Pin | Former ISA Bus Signal | New Local Bus Signal |
|---|---|---|
| B15 | DACK3 | CA26 |
| B16 | DRQ3 | CA27 |
| D5 | IRQ12 | BS8 |
| D4 | IRQ11 | BS16 |
| D8 | DACK0 | HLDA |
| D9 | DRQ0 | CA0 |
| D10 | DACK5 | CA31 |
| D11 | DRQ5 | CA30 |
| D12 | DACK6 | CA29 |
| D13 | DRQ6 | CA28 |

Figure 1:
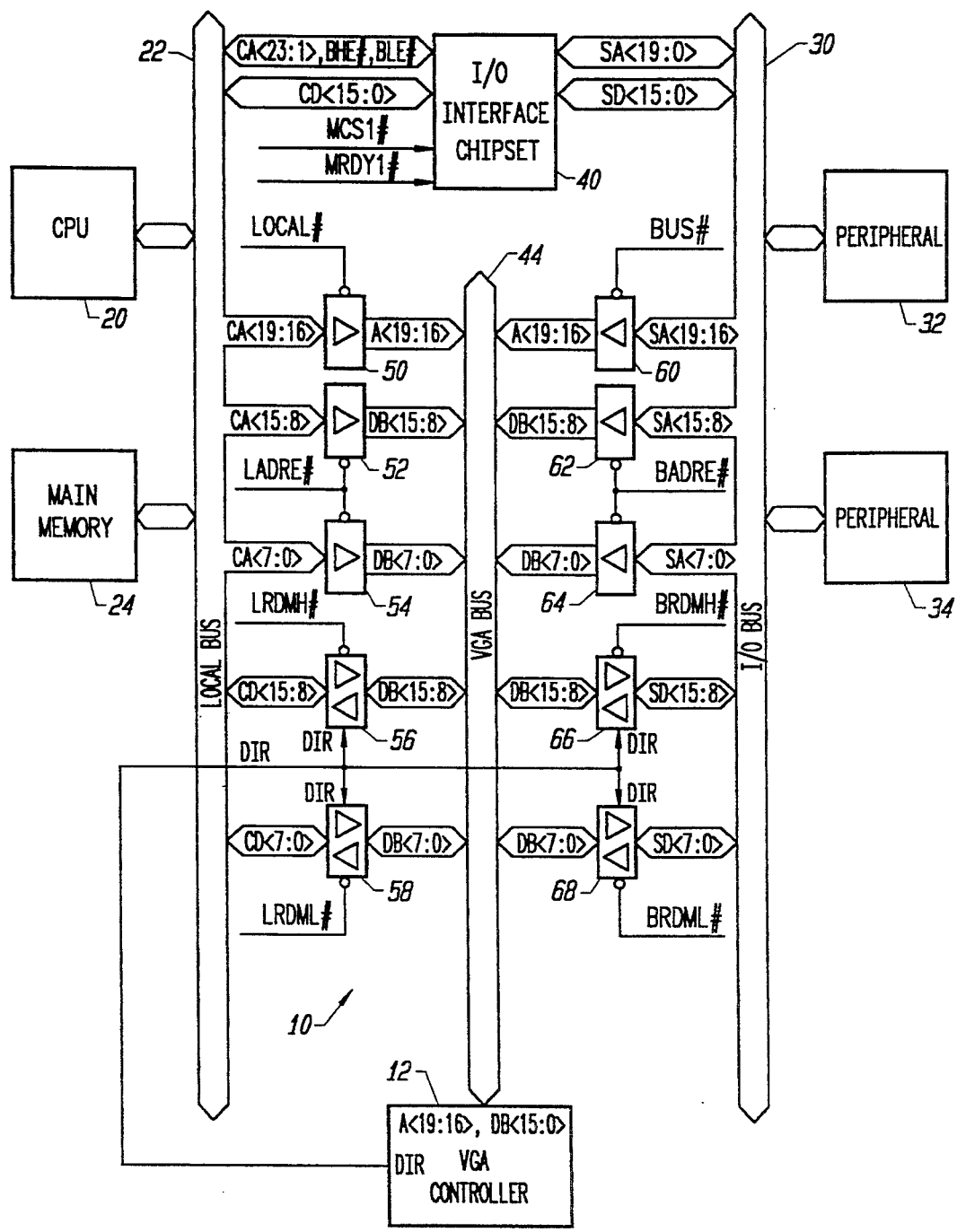
FIG. 1 is a functional block diagram of a prior art personal computer system architecture.
Figure 2:
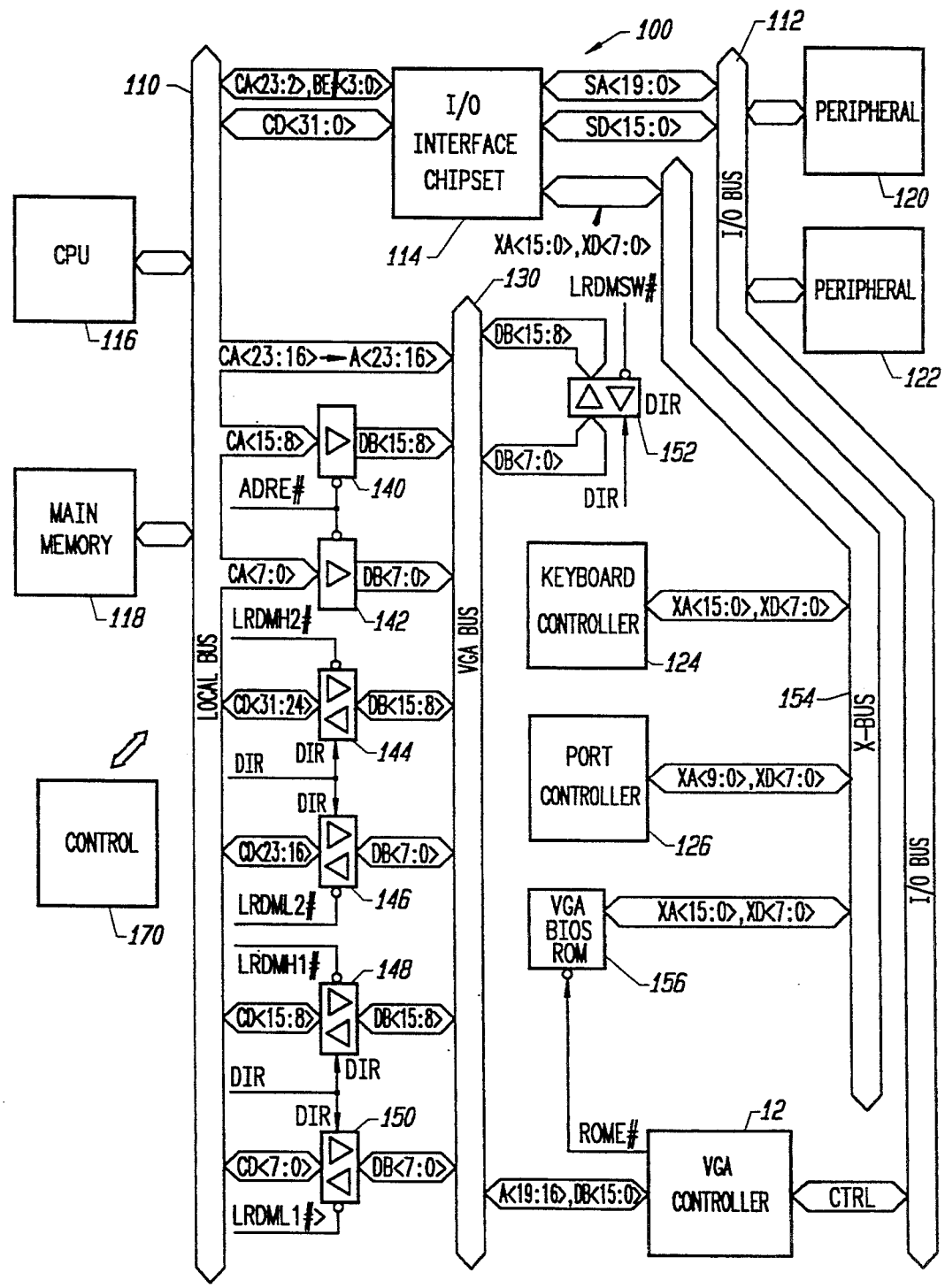
FIG. 2 is a functional block diagram of another personal computer system architecture.
Figure 3:
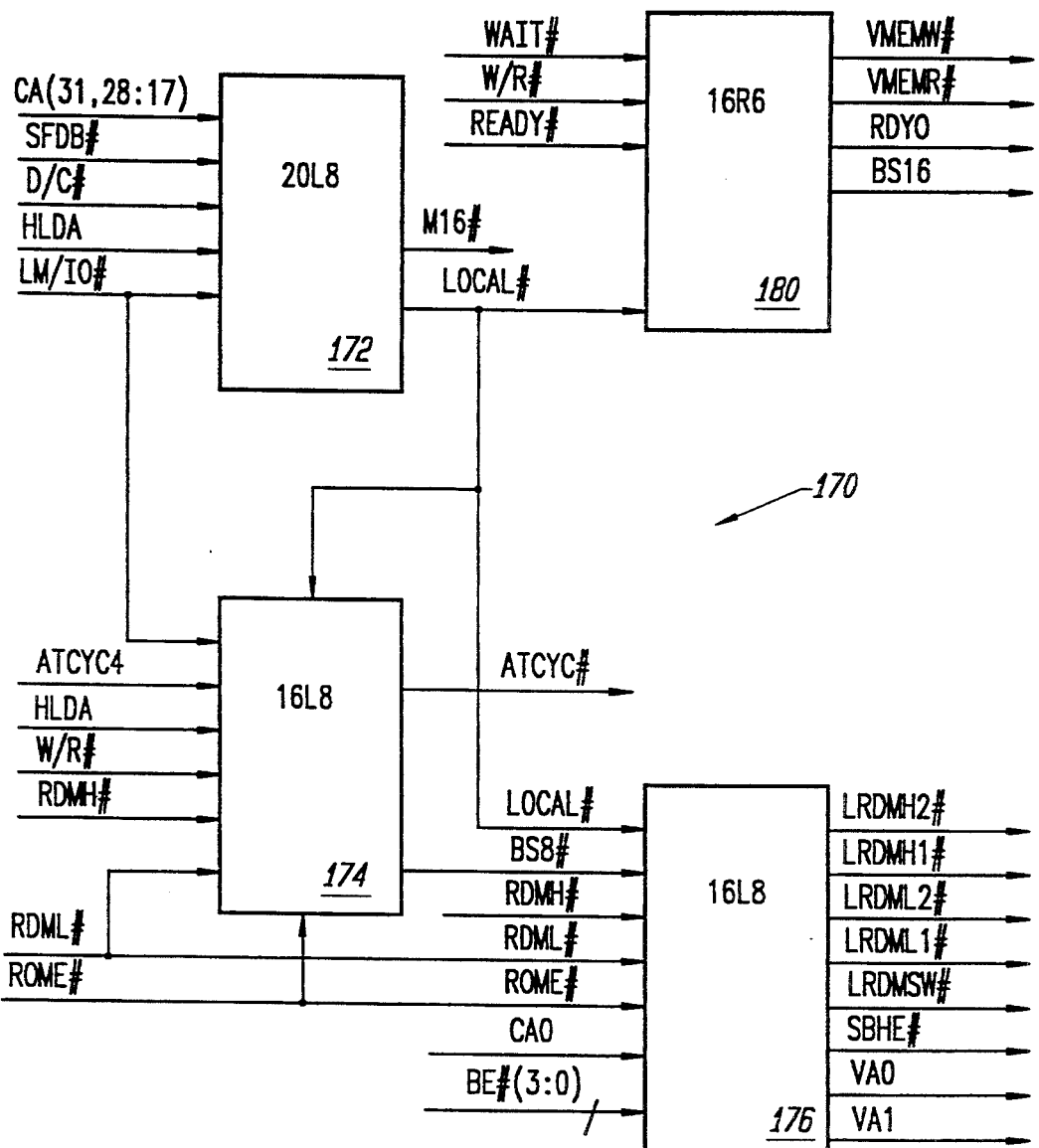
FIG. 3 is a detail of control circuitry 170 in FIG. 2.
Figure 8:
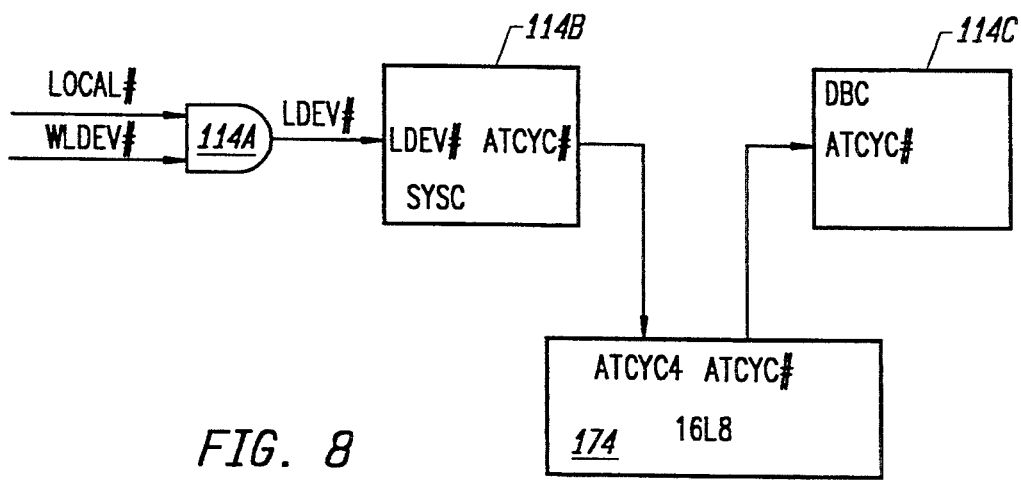
FIG. 8 is a diagram illustrating portions of the chipset and the control unit shown in FIG. 2.
Figure 4:
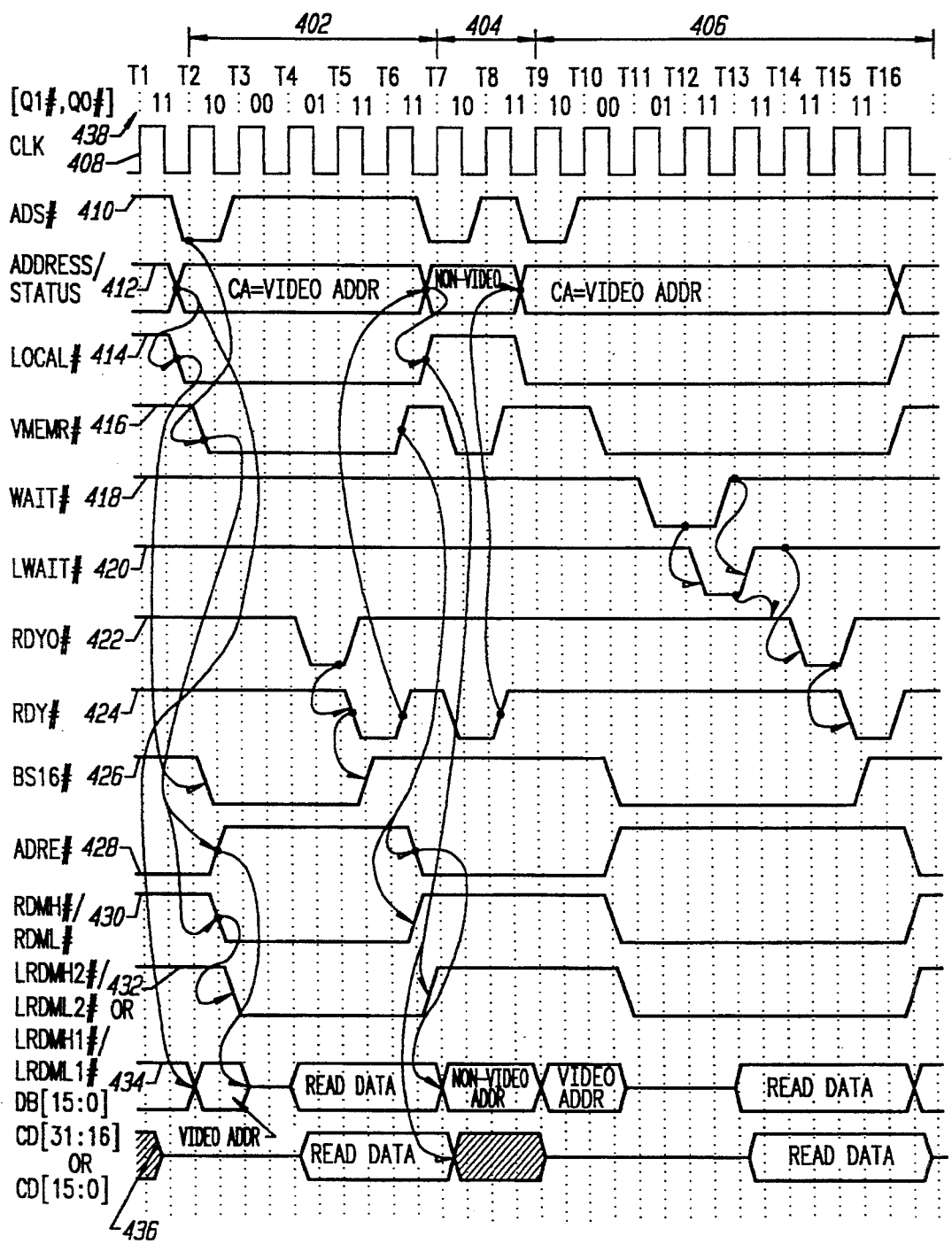
FIG. 4 is a timing diagram showing the operation of the apparatus of FIG. 2 for performing a read access to video memory.
Figure 5:
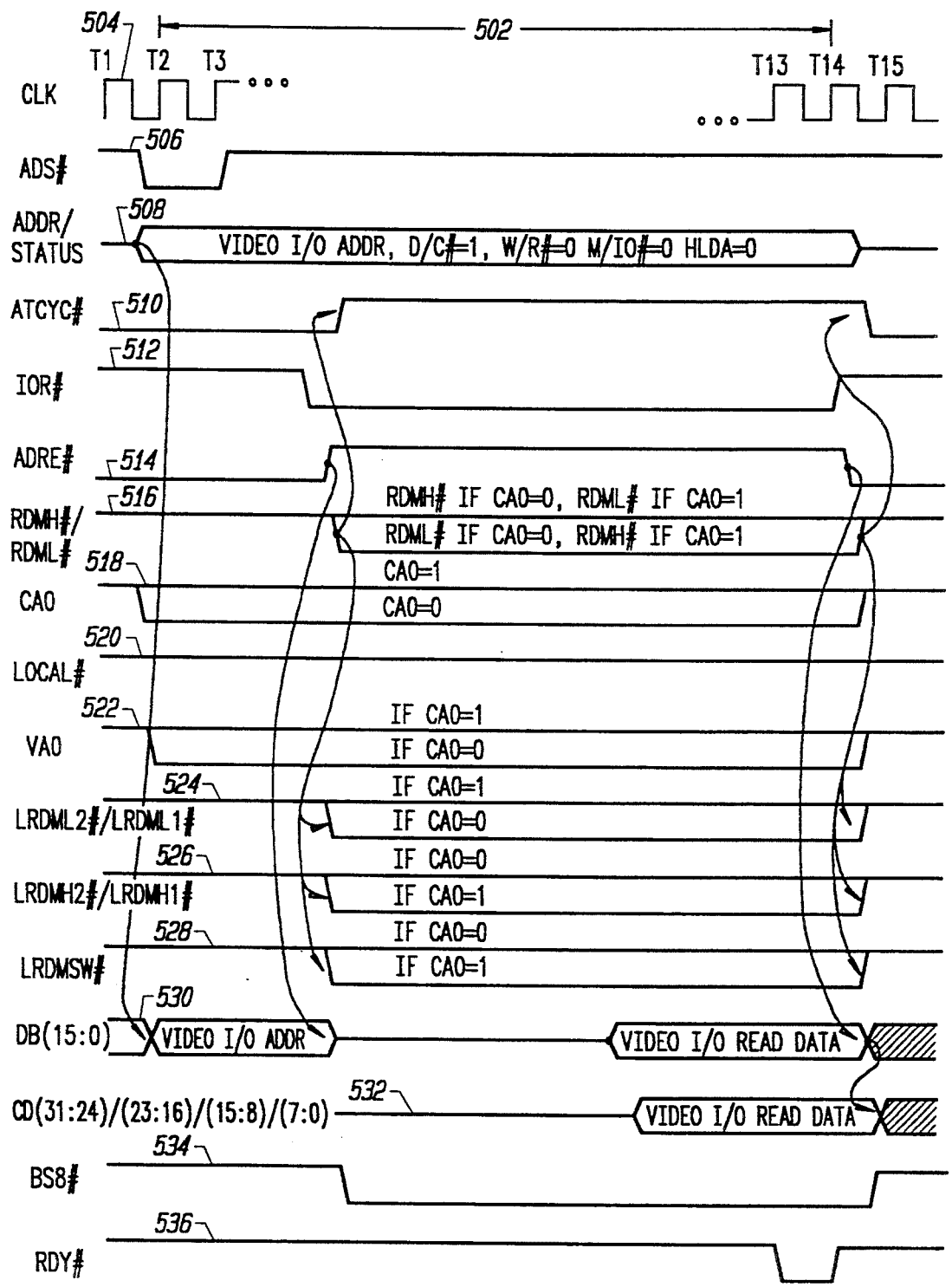
FIG. 5 is a timing diagram showing the operation of the apparatus of FIG. 2 for performing a read access to a video control register.
Figure 6:
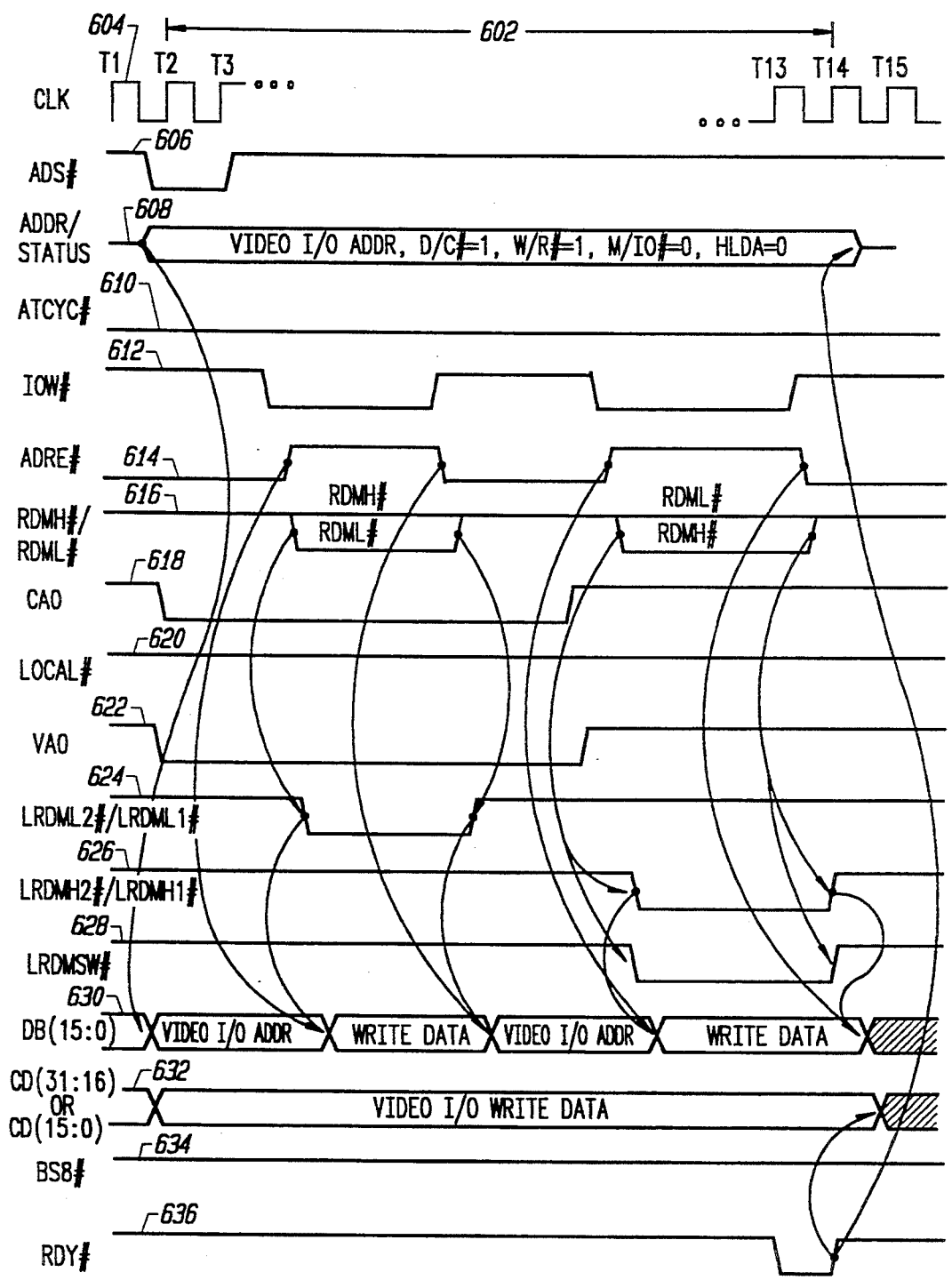
FIG. 6 is a timing diagram showing the operation of the apparatus of FIG. 2 for performing a write access to a video control register.
Figure 7:
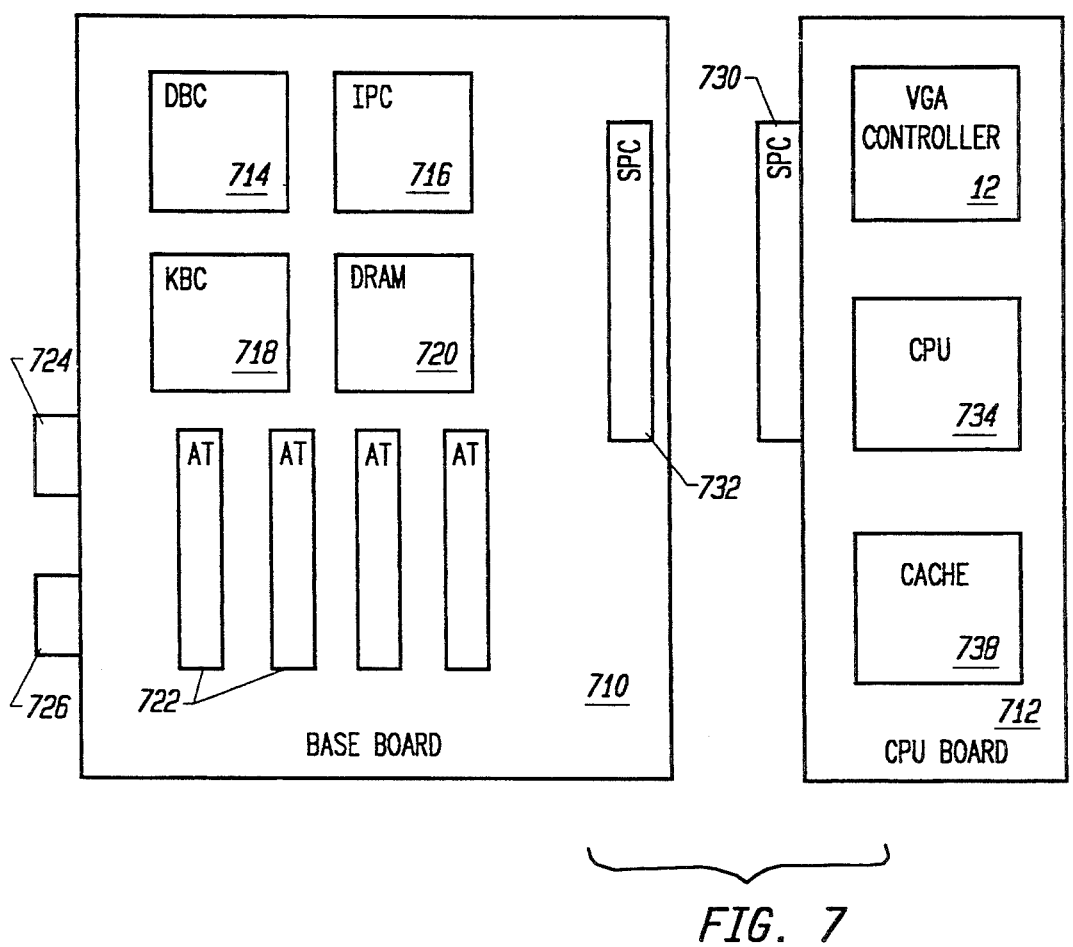
FIG. 7 is a board layout block diagram which may implement the architecture of FIG. 2.

Note that local bus cards designed to use the local bus features facilitated by the present invention need connect only to those signal lines on the local bus and the ISA bus which are needed to perform its desired operations. For example, a VGA card may listen and respond to local bus signals to handle accesses to the video memory address space, and may listen to ISA bus signals to respond to accesses to the VGA card's command and control registers. And after decoding such an access to command and control registers over the ISA bus, the card may be designed to read or to write the desired data over the ISA bus data lines, as in the architecture of FIG. 1, or it may be designed to return the data directly over the local bus data lines as in the architecture of FIG. 2. Another possibility would be to design the local bus card in such a way that it listens only to signals on the local bus, in which case the local bus card need not even connect to the connector contacts carrying ISA signals. The latter arrangement would prevent any accesses by ISA bus masters to I/O addresses on the card, unless the I/O interface chipset knows to capture such accesses and perform them over the local bus. The 82C496 performs this function.

Figure 19:
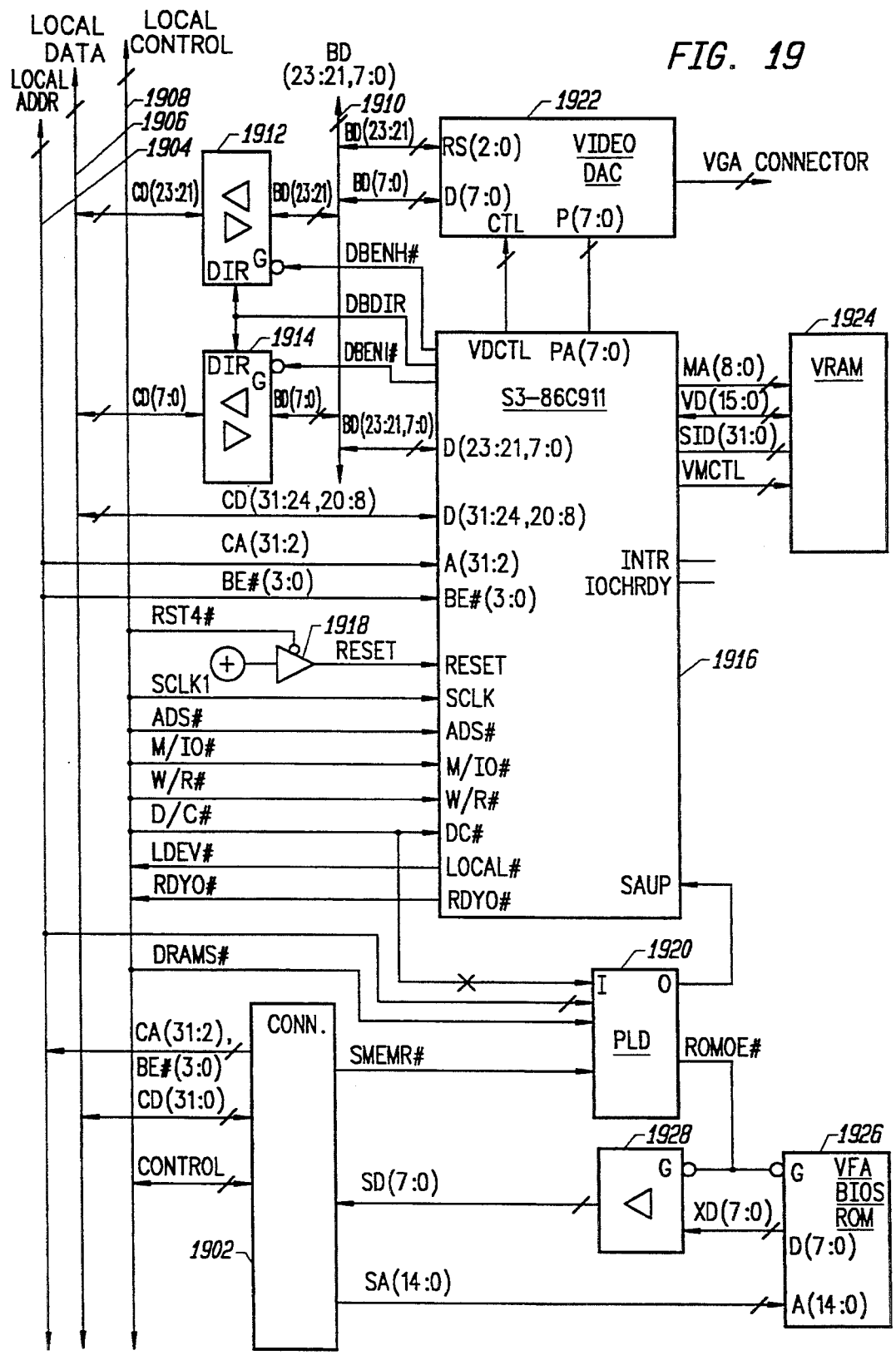
FIG. 19 is a block diagram of a local bus card which may be used with the present invention.

FIG. 19 is a block diagram of a VGA local bus card which may be used with the connector structure of the present invention. This card uses a VGA controller chip known as the 86C911, manufactured by S3 Corporation and described in the S3 Databook mentioned above. The implementation of FIG. 19 listens to the ISA bus only for detection of VGA BIOS ROM accesses, and returns BIOS ROM data over the ISA bus. All other accesses are detected and handled entirely over the local bus. The implementation of FIG. 19 also uses the RDYO# arrangement as shown in FIG. 15B, and does not require access to the additional local bus signals listed in Table II.

Referring to FIG. 19, an EISA-type edge card connector 1902 has pads which are connected to local address lines 1904, local data lines 1906 and local control lines 1908 of an on-board local bus. The signals include CA(31:2), BE#(3:0), CD(31:0), and various control signals. Local data lines CD(23:21) are coupled bi-directionally with lines BD(23:21) of a BD bus 1910, via a bi-directional buffer 1912. Similarly, local data lines CD(7:0) are coupled via a bi-directional buffer 1914 to BD bus lines BD(7:0). The BD bus signals BD(23:21, 7:0) are connected to respective data leads of the S3 chip 1916. Local data lines CD(31:24, 20:8) are connected directly to respective data pins of the S3 chip 1916. The S3 chip also generates DBENH# and DBENL# signals for strobing buffers 1912 and 1914, respectively, and generates a DBDIR signal for controlling the direction of transmission of such buffers.

The local address lines CA(31:2) and BE#(3:0) are connected directly to respective leads of the S3 chip 1916. The RST4# control signal of the local control lines 1908 is connected to an active low enable input of a buffer 1918, the input of which is connected to a logic 1, and the output of which is connected to an active high RESET input of the S3 chip 1916. Local control lines SCLK1, ADS#, M/IO#, W/R#, D/C#, LDEV# and RDYO# of the local control lines 1908 are connected directly to respective leads of the S3 chip 1916.

The DRAMS# signal of local control lines 1908 is connected to an input of a PLD 1920, which may be a 20L10. Other inputs of PLD 1920 receive the CA(24:15) signals from the local address lines 1904. The ISA bus SMEMR# signal is also connected from the edge card connector 1902 to an input of PLD 1920. PLD 1920 generates an SAUP signal which is connected to an input of the same name of the S3 chip 1916. SAUP is an upper address bits decode which must be asserted for the S3 chip to recognize accesses.

The S3 chip 1916 is connected via a plurality of control lines and via a P(7:0) bus to a video DAC 1922, which is also connected to the BD(23:21, 7:0) lines of BD bus 1910. DAC is also connected to a VGA connector (not shown). The S3 chip 1916 is also connected to a VRAM bank 1924 via address lines MA(8:0), data lines VD(15:0) and SID(31:0), and various control lines.

The pads of connector 1902 corresponding to the ISA bus SA(14:0) lines are connected to respective address inputs of a VGA BIOS ROM 1926. The 8-bit data output of BIOS ROM 1926 forms an on-board XD(7:0) bus, which is coupled via driver buffers 1928, to the edge card connector 1902 pads corresponding to ISA bus signals SD(7:0). The active low enables for both the ROM 1926 and the buffer 1928 are connected to receive an ROMOE# output generated by PLD 1920.

Figure 20:
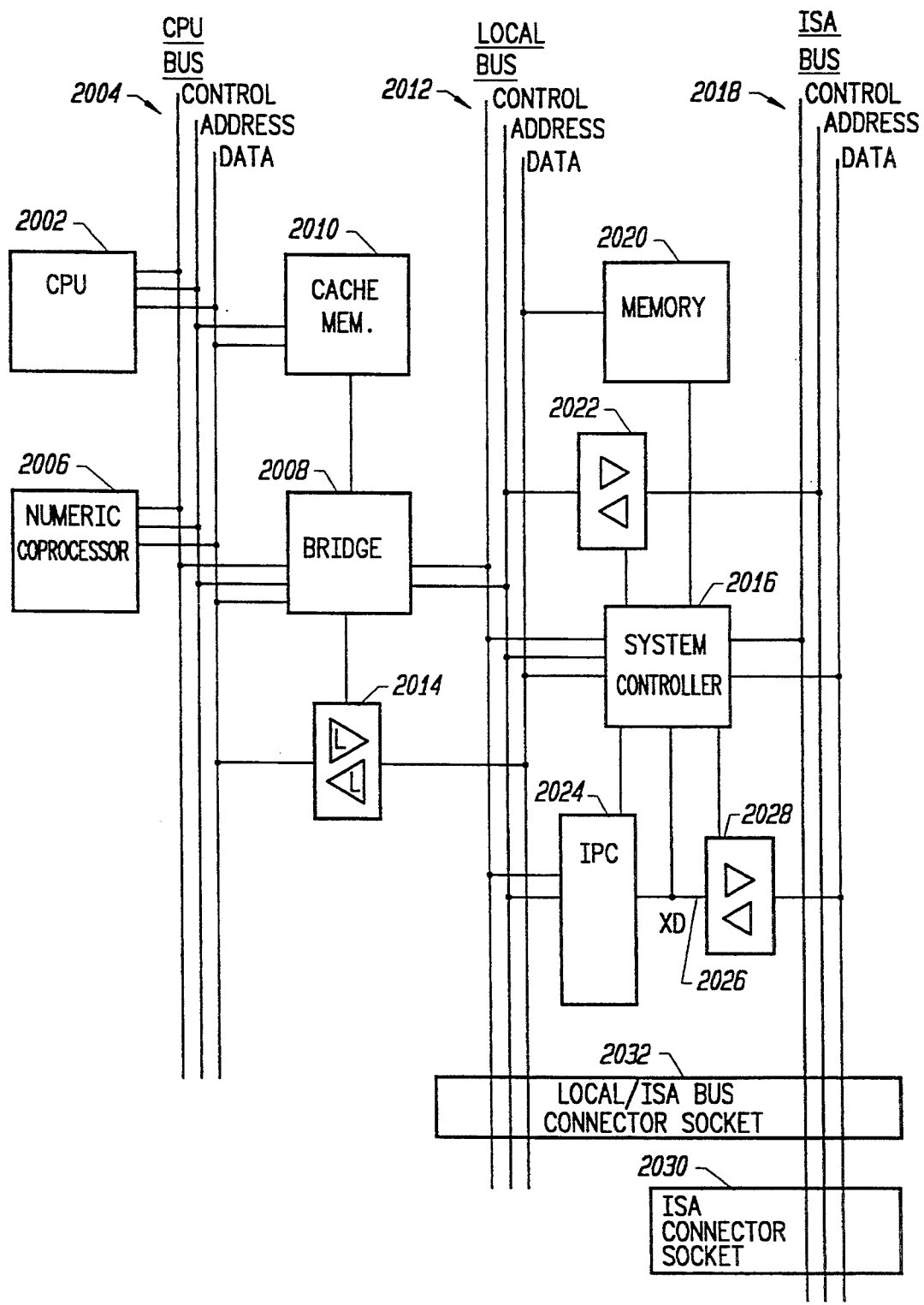
FIG. 20 is a symbolic block diagram of another computer architecture implementing features of the present invention.

As mentioned above, the local bus may be separated from the CPU by CPU bus—local bus bridge circuitry. Major aspects of such an arrangement are shown in the block diagram of FIG. 20. Referring to FIG. 20, the system includes a CPU 2002, which may be an Intel 80386 or 80486 compatible CPU, for example. The CPU 2002 has address, data and control lines which are connected to a CPU bus 2004. A numeric coprocessor 2006 may also be optionally connected to the CPU bus 2004. Control, address and data lines of CPU bus 2004 are also connected to the 82C497 bridge circuit 2008. The bridge circuit is described in OPTi, "82C497 Databook, version 2.0 (Preliminary)", (Mar. 10, 1992). Both the Databook and the chip are incorporated herein by reference. The 82C497 chip 2008 includes a cache controller, and has signals connected to cache memory 2010, which is also connected to some of the address and data lines of CPU bus 2004. The 82C497 chip 2008 is also connected to control and address lines of a local bus 2012, the data lines of which are coupled via a bi-directional latching buffer 2014 to the data lines of CPU bus 2004. Enablement and direction controls of the buffer 2014 are controlled by the 82C497 chip 2008.

The system of FIG. 20 further includes a system controller chip 2016, which may be an OPTi 82C496 chip described above. It is connected to control, address and data lines of local bus 2012 and is also connected to control and data lines of an ISA bus 2018. The system controller chip 2016 provides memory address and control information to main memory 2020, which is connected to the data lines of local bus 2012. It also controls a buffer 2022, which is connected between the address lines of the local bus 2012 and the ISA bus 2018. System controller 2016 is also connected to an IPC 2024 which may be an OPTi 82C206 such as that mentioned above with respect to FIG. 2. The IPC 2024 is connected to address and control lines of local bus 2012, and is also connected to an XD bus 2026. The XD bus is connected to the system controller 2016 and, via a buffer 2028, to data lines of the ISA bus 2018. Buffer 2028 is controlled by system controller 2016.

The system of FIG. 20 further includes one or more ISA connector sockets 2030, into which ISA accessory cards may be asserted. The ISA connector socket 2030 is connected to the control, address and data lines of ISA bus 2018. The system of FIG. 20 also includes one or more local/ISA bus connector sockets 2032, which are connected as previously described to the control, address and data lines of both the local bus 2012 and the ISA bus 2018. Either ISA accessory cards or local bus accessory cards may be inserted into local/ISA bus connector sockets 2032.

As described in the 82C497 Databook mentioned above, the chip 2008 provides asynchronous handshaking between the CPU bus 2004 and the local bus 2012, thereby permitting fixed base-board speed with upgradable CPU card speed. It includes a direct mapped writeback cache controller with a one-level write buffer, and together with the 82C496 system controller and 82C206 IPC, forms a "DXBB" building block chipset.

The 82C497 chip 2008 contains a CPU interface state machine which monitors and relays particular cycles to the related control units and returns READY# back to the CPU when the cycle is completed. Cache hit cycles are handled by cache control logic within the 82C497 chip 2008, and the CPU control signals (including ADS#) are not transmitted to the local bus 2012. On a cache read miss, a local bus state machine in the cache controller 2008 generates a copyback cycle on the local bus 2012 to copy any dirty cache data back to the appropriate location in memory 2020, if necessary, and then generates a memory read cycle to read in the appropriate data. The data on the data lines of local bus 2012 is coupled to the data lines of CPU bus 2004 via the buffer 2014 where it is read by the CPU and written to the cache 2010. Cache write hits also do not go to the local bus 2012. The 82C497 chip 2006 also isolates numeric coprocessor cycles (if any) and special CPU cycles from the local bus. The one-level deep write buffer capability of the cache controller 2008, and the latching buffer 2014, permit write cycles from the CPU bus 2004 to the local bus 2012 or beyond, to be terminated upon the determination that the local bus 2012 is not busy.

The local bus interface of 82C497 chip 2008 emulates most of the CPU control signals. The CPU's data and address lines, also, are manipulated in response to the requirements of the local bus cycle. The local bus controller asserts the local bus ADS# signal after receiving the cycle start request from the CPU bus 2004 (if the cycle is to go to the local bus), and then waits for the return of READY# over the local bus 2012 before asserting READY# onto the CPU bus 2004.

It can be seen that though the local bus 2012 is separated from the CPU bus 2004 by an 82C497 chip 2008 and latching buffer 2014, the local bus 2012 can operate at a data rate which is much higher than that of the ISA bus 2018. Whereas the ISA bus 2018 is limited by market forces to an 8 MB/sec. maximum data transfer rate, the local bus accessory card inserted into a local/ISA bus connector socket 2032 can operate at the high data rates of the local bus 2012, even if an equivalent ISA card is limited to the 8 MB/sec. maximum data rate of ISA buses. Moreover, the OPTi 82C497 chip emulates on the local bus 2012 virtually all of the address, data and control signals which appear on the CPU bus 2004. Accordingly, the embodiment shown in FIG. 20 can accept local bus cards which were designed to connect directly to the lines of the CPU bus 2004, thereby creating a common and well known target interface for the design of local bus accessory cards.

The invention has been described with respect to particular embodiments thereof, and it will be understood that numerous modifications are possible within the scope of the invention as set forth in the claims.

We claim:

1. Computer apparatus, for use with accessory cards of selectably a first or second type, said accessory cards each having connection pads, comprising:
   a circuit board;
   an I/O bus having I/O bus signal lines including I/O bus data lines, at least part of each of said I/O bus signal lines being supported by said circuit board;
   a local bus having local bus signal lines including local bus data lines, at least part of each of said local bus signal lines being supported by said circuit board;
   a source of local bus cycles coupled to said local bus;
   interface circuitry connected to said local bus and said I/O bus which transmits data between said local bus data lines and said I/O bus data lines in response to only selected ones of said local bus cycles; and
   an edge card socket having a slot for accepting a single accessory card, said socket being supported by said circuit board and having first and second distinct pluralities of contacts, at least one of said first plurality of contacts being coupled to a corresponding first one of said I/O bus signal lines on said circuit board and at least one of said second plurality of contacts being coupled to a corresponding second one of said local bus signal lines on said circuit board, said first and second pluralities of contacts in said edge card socket being arranged such that connection pads on accessory cards of said first type electrically contact contacts in said first plurality of contacts, including said contact coupled to the first I/O bus signal line, when accepted by said edge card socket, no connection pads on accessory cards of said first type electrically contacting contacts in said second plurality of contacts, including said contact coupled to the second local bus signal line, when accepted by said edge card socket, and such that connection pads on accessory cards of said second type electrically contact contacts in said second plurality of contacts, including said contact coupled to the second local bus signal line, when accepted by said edge card socket.

2. Computer apparatus according to claim 1, wherein all of said local bus data lines are coupled to corresponding ones of said second plurality of contacts.

3. Computer apparatus according to claim 2, wherein all of said I/O bus data lines are coupled to corresponding ones of said first plurality of contacts.

4. Computer apparatus according to claim 1, wherein said accessory cards of said first type include accessory cards of first and second sub-types, accessory cards of said first sub-type having connection pads for exactly eight data lines and accessory cards of said second sub-type having connection pads for 16 data lines, and wherein said I/O bus signal lines include 16 I/O bus data lines, all of which are coupled to corresponding ones of said first plurality of contacts, said first plurality of contacts being arranged to couple eight of said 16 I/O bus data lines to respective data lines on accessory cards of said first sub-type when accepted by said edge card socket, and said first plurality of contacts being arranged to couple said 16 I/O bus data lines to respective data lines on accessory cards of said second sub-type when accepted by said edge card socket.

5. Computer apparatus according to claim 1, wherein said edge card socket has a slot for accepting said accessory card, said slot being no longer than the edge card connector of a standard 16-bit ISA accessory card.

6. Computer apparatus according to claim 1, wherein said local bus signal lines include a plurality of local bus control lines coupled to contacts in said edge card socket, wherein all of the local bus control lines in said plurality of local bus control lines are coupled to corresponding ones of said second plurality of contacts.

7. Computer apparatus according to claim 6, wherein said I/O bus signal lines include a plurality of I/O bus control lines, all of which are coupled to corresponding ones of said first plurality of contacts.

8. Computer apparatus according to claim 7, wherein said I/O bus signal lines include additional I/O bus control lines distinct from said plurality of I/O bus control lines, said additional I/O bus control lines not being coupled to any contact on said edge card socket.

9. Computer apparatus according to claim 8, wherein said additional I/O bus control lines include only DMA request and acknowledge lines and interrupt request lines.

10. Computer apparatus according to claim 8, wherein said I/O bus conforms to the ISA standard, and wherein said additional I/O bus control lines consist of the DACK3, DRQ3, DACK0, DRQ0, DACK5, DRQ5, DACK6, DRQ6, IRQ11 and IRQ12 ISA control lines.

11. Computer apparatus according to claim 8, wherein said local bus signal lines include additional local bus signal lines coupled to corresponding ones of said first plurality of contacts and not coupled to any of said second plurality of contacts, and wherein said additional local bus signal lines are coupled to those of said first plurality of contacts which are vacated by said additional I/O bus control lines.

12. Computer apparatus according to claim 8, wherein said local bus signal lines include additional local bus signal lines coupled to corresponding ones of said first plurality of contacts and not coupled to any of said second plurality of contacts, and wherein said additional local bus signal lines include high order local bus address lines.

13. Computer apparatus according to claim 8, wherein said local bus signal lines include additional local bus signal lines coupled to corresponding ones of said first plurality of contacts and not coupled to any of said second plurality of contacts, and wherein said additional local bus signal lines include CA(31:26), BS8, BS16 and HLDA local bus signal lines.

14. Computer apparatus according to claim 1, wherein said local bus signal lines include additional local bus signal lines coupled to corresponding ones of said first plurality of contacts and not coupled to any of said second plurality of contacts.

15. Computer apparatus according to claim 1, wherein said source of local bus cycles comprises a microprocessor coupled to lines of said local bus and supported by said circuit board.

16. Computer apparatus according to claim 1, wherein said source of local bus cycles comprises:
a modularity connector coupled to said signal lines of said local bus and supported by said circuit board; and
a microprocessor coupled to signal lines of said local bus removably via said modularity connector.

17. Computer apparatus according to claim 1, wherein all of said local bus data lines are connected to corresponding ones of said second plurality of contacts, and wherein said source of local bus cycles comprises:
a microprocessor having data leads connected directly to said local bus data lines.

18. Computer apparatus according to claim 17, wherein said local bus signal lines further include a plurality of local bus control lines, all of which are connected to corresponding ones of said second plurality of contacts, wherein said microprocessor further has control leads connected directly to said plurality of local bus control lines.

19. Computer apparatus according to claim 1, wherein all of said local bus data lines are connected to corresponding ones of said second plurality of contacts, and wherein said source of local bus cycles comprises:
a microprocessor having data leads coupled to said local bus data lines via a bi-directional buffer.

20. Computer apparatus according to claim 1, wherein all of said local bus data lines are connected to corresponding ones of said second plurality of contacts, and wherein said source of local bus cycles comprises:
a microprocessor having data leads coupled to said local bus data lines via a bi-directional latch.

21. Computer apparatus according to claim 1, wherein said local bus signal lines include a plurality of local bus control lines, and wherein said source of local bus cycles comprises:
a microprocessor having a plurality of control leads corresponding to said plurality of local bus control lines; and
means for asserting signals on said plurality of local bus control lines to conduct a cycle over said local bus in response to signals received from said microprocessor control leads, and for indicating termination of said local bus cycle to said microprocessor over said microprocessor control leads in response to completion signals received over said local bus control lines.

22. Computer apparatus according to claim 21, further comprising a cache memory, wherein said means for asserting is further for controlling said cache memory in response signals received over said microprocessor control leads.

23. Computer apparatus according to claim 1, wherein said edge card socket comprises:
a molded box with an elongated opening along its upper surface forming an interior slot;
at least two levels of spring-loaded contacts on at least one interior wall of said slot; and
transverse walls disposed within the interior of said slot.

24. Computer apparatus according to claim 23, wherein said first level of contacts is staggered with respect to said second level of contacts.

25. Computer apparatus according to claim 23, further comprising at least two levels of spring-loaded contacts on opposite walls of said slot.

26. Computer apparatus according to claim 25, wherein said first level of contacts is staggered with respect to the second level of contacts.

27. Computer apparatus according to claim 1, wherein said edge card socket comprises:
a molded box with an elongated opening along its upper surface forming an interior slot;
at least two levels of contacts, being an upper level and a lower level of spring-loaded contacts, on at least one interior wall of said slot; and
transverse walls disposed within the interior of said slot, the height of said transverse walls being lower than said upper level of contacts such that said walls limit the insertion of a mating card edge to permit mating with said upper level of contacts and not said lower level of contacts.

28. Computer apparatus according to claim 1, further comprising a particular accessory card of said second type, said particular accessory card including:
an on-board bus having on-board data lines coupled to connection pads arranged to electrically contact contacts in said second plurality of contacts when accepted by said edge card socket; and
a peripheral device controller on said particular accessory card, said peripheral device controller providing read data on said on-board data lines in response to control signals received by said peripheral device controller via said edge card socket.

29. Computer apparatus according to claim 28, wherein said peripheral device controller receives said control signals via contacts in said first plurality of contacts.

30. Computer apparatus, comprising:
an ISA bus having at least the following industry standard signals: SD(15:0), SA(19:0), LA(23:17), NOWS#, SMWTC#, SMRDC#, IOW#, IOR#, REFRESH#, BCLK, TC, BALE, OSC, IOCS#, MASTER#, IOCHCK#, CHRDY, AEN#, SBHE#, MRDC#, and MWTC#;
a local bus having local bus signal lines including a plurality of data, address and control lines;
a source of cycles on said local bus;
interface circuitry connected to said local bus and said ISA bus which transmits data between said local bus data lines and said ISA bus SD(15:0) lines in response to only selected ones of said local bus cycles; and
an edge card connector socket having a slot with two opposing interior walls, an upper pair of rows of contacts opposing each other from said opposing walls, and a lower pair of rows of contacts opposing each other from said opposing walls,
all of said listed ISA bus signal lines being connected to respective contacts in said upper rows of contacts, and all of said contacts in said lower rows of contacts being connected to respective ones of said local bus signal lines.

31. Computer apparatus according to claim 30, wherein said plurality of local bus signal lines connected to said contacts in said lower row of contacts include: CA(25:2), CD(31:0), BE#(3:0), DRAMS#, HRQ0, M/IO#, W/R#, SCLK, LDEV#, READY#, HLDA1, ADS#, D/C#, and RDYO#.

32. Computer apparatus according to claim 31, wherein said local bus further comprises additional signal lines connected to respective contacts in said upper rows of contacts and not connected to any contacts in any said lower rows of contacts, said additional local bus signal lines including: CA(31:26), BS8 and BS16.

* * * * *